United States Patent
Iwasaki et al.

(10) Patent No.: US 8,111,594 B2
(45) Date of Patent: Feb. 7, 2012

(54) OPTICAL DISK DRIVE AND OPTICAL PICKUP HAVING ABERRATION CORRECTION MEANS

(75) Inventors: Masayuki Iwasaki, Saitama (JP); Naoki Fujii, Saitama (JP); Seiichi Ohsawa, Saitama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 817 days.

(21) Appl. No.: 11/284,423

(22) Filed: Nov. 22, 2005

(65) Prior Publication Data

US 2006/0181971 A1  Aug. 17, 2006

(30) Foreign Application Priority Data

Nov. 25, 2004  (JP) ................................. 2004-340467

(51) Int. Cl.
*G11B 7/00* (2006.01)
(52) U.S. Cl. ................................. 369/44.23; 369/112.02
(58) Field of Classification Search .... 369/44.11–44.12, 369/44.23–44.24, 44.27–44.33, 47.44–47.45, 369/47.49, 53.2, 53.22, 53.25, 53.31, 53.33, 369/112.02

See application file for complete search history.

(56) References Cited

U.S. PATENT DOCUMENTS

| | | | | |
|---|---|---|---|---|
| 5,793,735 A | * | 8/1998 | Oono | 369/112.02 |
| 6,151,154 A | * | 11/2000 | Ogasawara et al. | 359/279 |
| 6,449,236 B2 | * | 9/2002 | Wals et al. | 369/112.02 |
| 2002/0136120 A1 | * | 9/2002 | Kurebayashi et al. | 369/47.51 |
| 2004/0037198 A1 | * | 2/2004 | Sasaki et al. | 369/53.26 |

FOREIGN PATENT DOCUMENTS

| | | |
|---|---|---|
| JP | 11-259892 | 9/1999 |
| JP | 2000-40249 | 2/2000 |
| JP | 2003-257069 | 9/2003 |
| JP | 2003-346375 | 12/2003 |

* cited by examiner

*Primary Examiner* — Nathan Danielsen
(74) *Attorney, Agent, or Firm* — Westerman, Hattori, Daniels & Adrian, LLP

(57) ABSTRACT

In an optical disk drive mounting a drive unit 20 having a control use circuit 21, and a pickup 1 having an aberration correction liquid crystal element 13 and a drive use circuit 2 which drives the aberration correction liquid crystal element, wherein the drive use circuit 2 stores astigmatic data for correcting a static astigmatism peculiarly provided in an optical system in the pickup 1 in an astigmatic data storage 6, and drives the aberration correction liquid crystal element 13 based on the astigmatic data. By storing the static astigmatic data peculiar to the pickup, inside the pickup, it is possible to transfer the stored astigmatic data to the optical disk drive side easily, and to correct the astigmatism by driving the aberration correction liquid crystal element based on the astigmatic data.

5 Claims, 17 Drawing Sheets

PRIOR ART

PRIOR ART

OPTICAL DISK DRIVE AND OPTICAL PICKUP HAVING ABERRATION CORRECTION MEANS

BACKGROUND OF THE INVENTION

1. Field of the Invention

The present invention relates to an optical disk drive and optical pickup, which irradiate an information-recording medium such as CD and DVD with a light beam, for performing information reproduction or recording, and in particular, it relates to an improvement of aberration correction in the pickup which is mounted on this optical disk drive.

2. Description of the Related Art

Conventionally, there has been a problem of deterioration in performance of a pickup mounted on an optical disk drive or the like, which performs reproduction or recording from/on an optical disk such as DVD. Such deterioration is caused by an influence of wavefront aberration generated by various factors.

For instance, the wavefront aberration includes coma aberration caused by tilted angle of the optical disk, spherical aberration caused by a difference in substrate thickness of the optical disk, and the like. The coma aberration and the spherical aberration mentioned above are dynamic aberrations which fluctuate along with driving of the optical disk drive. In addition to those dynamic aberrations, there also exists a static astigmatism caused by an optical system. This static astigmatism occurs due to errors such as precision errors and assembling errors in optical components. Therefore, there is a characteristic that even if a pickup includes an optical system of the same configuration designed by the same specification, astigmatism in each pickup may be different in direction and size. In order to correct this astigmatism, there has been proposed an aberration correcting apparatus. In this aberration correcting apparatus, a liquid crystal element is placed within an optical path in the pickup, refraction index of the liquid crystal is changed by applying voltage on this liquid crystal element, and the astigmatism is corrected by giving a phase difference to a light beam passing through the liquid crystal element (for example, see the Japanese Patent Laid-open Publication No. 2000-40249, Page 5, FIG. 1 and the Japanese Patent Laid-open Publication No. Hei-11-259892 (1999-259892), FIG. 5, hereinafter, referred to as Patent Document 1 and Patent Document 2, respectively).

Hereinafter, a related art disclosed by the Patent Document 1 will be explained with reference to the accompanying drawings. FIG. 14 is a block diagram showing a configuration of the optical pickup mounted on a conventional optical disk drive.

In FIG. 14, the optical pickup comprises a laser light source 41, polarized beam splitter 42, liquid crystal element 43 functioning as an astigmatism correcting means, quarter wavelength plate 44, objective lens 45, condenser lens 46, optical receiver 47, and liquid crystal element controller 48. In addition, the optical disk 50 that is irradiated with a light beam by the optical pickup is designed to be rotationally driven by a spindle motor 49. Here, the light beam 51 emitted from the laser light source 41 passes through the polarized beam splitter 42, and the light beam 51 is incident onto the liquid crystal element 43, further passes through the quarter wavelength plate 44, and the light beam is focused on the information recording surface of the optical disk 50 by the objective lens 45.

In other words, the liquid crystal element 43 is placed in passage area of the light beam 51. This liquid crystal element 43 is driven by means of liquid crystal element controller 48 to correct astigmatism. On the other hand, the light beam 51 is reflected from the information recording surface of the optical disk 50, and again, the light beam passes through the objective lens 45 and the quarter wavelength plate 44 in this order. Then, the optical path is changed by the polarized beam splitter 42, and the light beam is focused on the optical receiver 47 through the condenser lens 46. The optical receiver 47 converts the received optical signal to an electrical signal, and outputs thus converted signal.

Next, FIG. 15 shows an electrode structure of the liquid crystal element 43.

In FIG. 15, reference numeral 52 indicates an incident range of the light beam 51. The liquid crystal element 43 is divided into nine pattern electrodes 53a to 53i within this incident range 52. In other words, a circular pattern electrode 53a is formed in such a manner as being associated with the center portion of the incident range 52. In addition, eight pattern electrodes 53b to 53i, radially divided, are formed on the outer periphery of the incident range 52. Accordingly, the eight pattern electrodes 53b to 53i are divided almost equi-angularly about the center of the incident range 52, and arranged symmetrically.

The pattern electrodes 53b, 53c, 53d, and 53e are respectively facing to 53f, 53g, 53h, and 53i, being arranged centrosymmetrically. With this arrangement of the pattern electrodes, it is possible to handle a particular direction of the astigmatism. A drive pattern of the liquid crystal element 43 is determined by voltages applied to a plurality of pattern electrodes 53a to 53i. The voltages applied to the pattern electrodes 53a to 53i are determined according to the direction and size of the astigmatism, whereby it is possible to correct the astigmatism by providing a phase difference to the light beam 51 passing through each divided area. As thus described, according to the disclosure by the Patent Document 1, the astigmatism caused by the optical system of the optical pickup can be corrected. Therefore, optical components do not need necessarily to be with an extremely high precision, adjustments after assembling are not required either, and thus it is possible to correct the astigmatism of the optical pickup favorably.

As one of another conventional arts, there is proposed a pickup unit which has a built-in control circuit, and this built-in control circuit controls the laser light source, photo-transformation element, the liquid crystal element and the like prepared for aberration correction (see Japanese Patent Laid-open Publication No. 2003-346375, Page 4, FIG. 1, hereinafter referred to as Patent Document 3). Hereinafter, the conventional art disclosed in the Patent Document 3 will be explained with reference to the accompanying drawings. FIG. 16 is a block diagram showing a schematic configuration of a conventional pickup unit and an optical disk drive on which this pickup unit is mounted.

In FIG. 16, the optical disk drive 60 is an apparatus which records information on various optical disks such as DVD-R and DVD-RW, and reproduces the information being recorded. FIG. 16 shows only a pickup unit 61 and a main substrate 70 electrically connected to the pickup unit 61 within the optical disk drive 60.

The pickup unit 61 is provided with optical system components 62 including objective lens and the like, electrical components 63 including laser diode as a laser light source, photo-transformation element, liquid crystal element, and driver, and control circuit 64 including a small-scale microcomputer and the like. Those constituent elements are arranged on a flexible substrate 65. In addition, a connector 66 is installed on the edge of the flexible substrate 65. On the other hand, a microcomputer 71 for controlling the entire operations of the optical disk drive 60, and a recording signal generator 72 which generates data to be recorded on the optical disk (not illustrated) are arranged on the main substrate 70. The microcomputer 71 in the main substrate 70 and the connector 66 in the pickup unit 61 are electrically connected via a signal line 73. The recording data which the recording signal generator 72 has generated is transmitted to the pickup unit 61 via a signal line 74 which is provided separately from the signal line 73.

In the above configuration, the microcomputer 71 in the main substrate 70 transmits various control commands to the control circuit 64 in the pickup unit 61 via the signal line 73. The control circuit 64 executes various controls on the electrical components 63 according to the control commands from the microcomputer 71. The control circuit 64 including a small-scale microcomputer and the like, being provided within the pickup unit 61, performs control of the electrical components 63 built in the pickup unit 61, without depending on the microcomputer 71 provided externally. Accordingly, it is possible to shorten the signal line between the electrical components 63 and the control circuit 64, and influences of noise generated from the signal line can be suppressed. In addition, the pickup unit 61 can be downsized with the shortened signal line. As for the microcomputer 71 of the main substrate 70, it is only required to output a control command to the control circuit 64 in the pickup unit 61, and thus loads onto the microcomputer 71 can be reduced.

Furthermore, there is also known a conventional art which corrects spherical aberration of an optical pickup (see Japanese Patent Laid-open Publication No. 2003-257069, FIG. 1, hereinafter referred to as Patent Document 4). The conventional art disclosed in the Patent Document 4 will be explained with reference to the accompanying drawings. FIG. 17 is a block diagram showing a schematic configuration of a conventional optical pickup unit and a drive substrate.

In FIG. 17, the optical pickup 81 is provided with an optical system 85 which performs light irradiation and light acceptance on/from a recording medium (not illustrated), an objective actuator 82 which drives an objective lens (not illustrated), an expander actuator 83 which drives an expander lens, and a memory means 84. The expander lens corrects the spherical aberration, by changing lens spacing. Furthermore, the memory means 84 stores a drive voltage of the expander actuator 83.

Drive substrate 91 is provided with a drive controller 94 for controlling the device entirely, an objective actuator driver 92 which drives the objective actuator 82 under the control of the drive controller 94, and a lens driver 93 which drives the expander actuator 83 under the control of the drive controller 94.

The drive controller 94 reads a value of the spherical aberration correction voltage stored in the memory means 84. Then, the drive controller 94 adds the value of the spherical aberration correction voltage having been read out to the drive voltage of the expander lens, and after that, transmits to the lens driver 93 a command to actuate the expander actuator 83.

By adding the stored value of the spherical aberration correction voltage to the drive voltage of the expander lens, it is possible to shorten the initial processing time required for the spherical aberration correction.

In the pickup units as described in the Patent Documents 1 and 2, however, in order to correct the optical system aberration of individual pickup by use of the liquid crystal element, it is necessary to provide the optical disk drive side with astigmatic data peculiarly held by the pickup, calculate correction data based on this peculiar astigmatic data on the optical disk drive side, and gives a feedback to the pickup side. Therefore, conventionally it has been performed that the astigmatic data peculiar to the pickup is measured individually when a pickup manufacturer produces the pickup, and the pickup manufacturer supplies the data, through various means, to an optical disk drive manufacturer who incorporates the pickup into the optical disk drive.

For example, such various means may include a method which supplies the astigmatic data by attaching a bar code onto a packaging material or the like for packing the pickup, or a method which creates a data table in which astigmatic data is associated with a serial number of the pickup, and supplies the data table together with the pickup. Then, it has been performed that when the optical disk drive manufacturer incorporates the pickup into the disk drive, the individual astigmatic data supplied with the bar code or the data table, is memorized inside the optical disk drive by any means, so as to execute a process to calculate correction data.

However, from a standpoint of the pickup manufacturer, there is a problem that creation of bar code or data table for the astigmatic data may drive up man-hour in manufacturing, resulting in a cost increase. On the other hand, from a standpoint of the optical disk drive manufacturer, the operation for reading the bar code or data table, or the operation for writing the data into the optical disk drive is additionally required. Therefore, in addition to the problem that the manufacturing process may be complicated and workability is lowered, there is a risk that errors may occur such as an error in reading the bar code or the data table, and an error in writing the read-in astigmatic data.

In other words, improvement is now demanded in supplying the astigmatic data from the pickup manufacturer to the optical disk drive manufacturer. Each manufacturing process is required to be simplified to reduce cost, and to enhance reliability by avoiding operational errors or the like, and those are critical issues.

As for the pickup unit as disclosed by the Patent Document 3, the liquid crystal element contained in the optical system components is controlled by a control circuit provided inside the pickup unit, and with this configuration, it is possible to execute the aberration correction. However, there is no consideration as to improvements in a means for supplying the optical disk drive side with the astigmatic data peculiar to the pickup. Therefore, similar to the first example of the related arts, it is necessary to utilize a general supplying means by use of bar code, data table, and the like.

In other words, also in the example of the related arts as disclosed by the Patent Document 3, an improvement is required in supplying the astigmatic data from the pickup manufacturer to the optical disk drive manufacturer.

The information recording/reproducing apparatus as disclosed in the Patent Document 4 corrects a spherical aberration as a type of wavefront aberration, being a dynamic aberration which fluctuates according to driving of the optical disk drive, but it is not intended for correcting the astigmatism being static.

In the technique as disclosed by the Patent Document 4, it is the dynamic aberration which is corrected by a correction process constantly performed while the optical disk is being driven, and it is unknown whether this technique is adequate for correcting the static aberration. In addition, with the expander lens, the spherical aberration can be corrected but the astigmatism cannot be corrected.

OBJECTS AND SUMMARY OF THE INVENTION

An object of the present invention is to solve such conventional problems as described above and to implement an optical disk drive and optical pickup, which are capable of supplying astigmatic data peculiar to the pickup, to an optical disk drive manufacturer who mounts the pickup, easily and with a high reliability.

In order to solve the above problems, the optical disk drive and the optical pickup according to the present invention employ the configuration as described in the following.

FIG. 1 is a schematic block diagram to explain a configuration of the optical disk drive according to the present invention.

The optical disk drive of the present invention is installing a drive unit 20 having a control use circuit 21, and a pickup 1 having an aberration correction liquid crystal element 13a and a drive use circuit 2 which drives this aberration correction liquid crystal element 13a. The drive use circuit 2 stores astigmatic data Dk for correcting a static astigmatism in astigmatic data storage 6, the static astigmatism being peculiarly provided in the optical system (optical system component 10) of the pickup 1, and the drive use circuit 2 drives the aberration correction liquid crystal element 13a on the basis of this astigmatic data Dk.

In addition, the optical pickup 1 according to the present invention is provided with the optical system component 10 which carries out light irradiation onto an optical disk and light detection from the optical disk, the aberration correction liquid crystal element 13a which corrects a wavefront aberration on the optical path within this optical system component 10, and the drive use circuit 2 which drives this aberration correction liquid crystal element 13a. The drive use circuit 2 stores in the astigmatic data storage 6, the astigmatic data Dk prepared for correcting a static astigmatism peculiarly provided in the optical system, and based on this astigmatic data Dk, the drive use circuit 2 drives the aberration correction liquid crystal element 13a.

According to the optical disk drive of the present invention, the static astigmatic data peculiar to the pickup is stored inside the pickup. Therefore, it is possible to easily transfer thus stored astigmatic data to the optical disk drive side, whereby the astigmatism can be corrected by driving the aberration correction liquid crystal element based on the astigmatic data.

FIG. 2 is a schematic block diagram which explains a transfer of the astigmatic data to the optical disk drive side, and driving of the aberration correction liquid crystal element based on this astigmatic data.

FIG. 2 shows an example in which pickups 1A and 1B are respectively mounted on randomly chosen drive units 20A and 20B. The astigmatic data storages 6 in the pickups 1A and 1B store the astigmatic data Dka and Dkb, respectively, which are peculiarly provided in the optical system components A1 and A2 in the pickups respectively. These pickups 1A and 1B have the same configuration as the pickup 1 as shown in FIG. 1, and only astigmatic data Dk stored in the astigmatic data storage 6 is different.

When the pickup 1A is mounted on the drive unit 20A, they are connected via the connector 32, and the astigmatic data Dka stored in the astigmatic data storage 6 is transferred to the aberration correction data operation unit 26 on the drive unit 20A side. The aberration correction data operation unit 26 transmits the aberration correction data Dha to the drive use circuit A2. The drive use circuit A2 drives the aberration correction liquid crystal element 13a based on the aberration correction data Dha, thereby correcting the astigmatism. The correction is carried out similarly in the case where the optical pickup 1B which stores astigmatic data Dkb, being different from the astigmatic data Dka in the pickup 1A, is mounted on the drive unit 20B.

On the drive unit 20 side, the aberration correction data is calculated based on the astigmatic data transferred from the pickup 1. Therefore, it is possible to arbitrarily combine the optical pickup 1 and the drive unit 20. Therefore, even if FIG. 2 shows an example that the pickup 1A is mounted on the drive unit 20A and the pickup 1B is mounted on the drive unit 20B, it is also possible to carry out the correction of the astigmatism in each pickup similarly, with the configuration that the pickup 1A is mounted on the drive unit 20B and the pickup 1B is mounted on the drive unit 20A.

Therefore, in both of the pickup manufacturer and the optical disk drive manufacturer, manufacturing process is simplified and costs are reduced, whereby the astigmatism correction in the optical system can be achieved with a high reliability.

In addition, the drive unit 20 is provided with an aberration correction data operation unit 26. The aberration correction data operation unit 26 reads out the astigmatic data Dk from the drive use circuit 2 under the control of the control use circuit 21, and the aberration correction data Dh is calculated based on thus read out astigmatic data Dk, and then the data Dh is transmitted back to the drive use circuit 2. The drive use circuit 2 drives the aberration correction liquid crystal element 13a based on the aberration correction data Dh.

Accordingly, the aberration correction data is calculated based on the astigmatic data from the pickup side, by the aberration correction data operation unit provided within the optical disk drive. Therefore, correction of the astigmatism peculiar to the pickup can be executed by the optical disk drive itself, and it is possible to provide an optical disk drive with a high performance and a high reliability.

In addition, the aberration correction data operation unit 26 is capable of calculating the aberration correction data Dh, on the basis of the astigmatic data Dk to correct the static astigmatism read out from the drive use circuit 2 and detected correction data Ddh to correct a dynamic aberration detected by the pickup 1. The drive use circuit 2 drives the aberration correction liquid crystal element 13a based on the aberration correction data Dh which corrects the static astigmatism and the dynamic aberration, and thus these static aberration and the dynamic aberration are simultaneously corrected.

As thus described, the aberration correction data operation unit provided within the optical disk drive calculates aberration correction data, which is obtained by synthesizing the optical system aberration data peculiar to the pickup with the detected correction data caused by the optical disk. Therefore, the correction of astigmatism peculiar to the pickup and the correction of the aberration caused by the optical disk can be simultaneously executed by the optical disk drive itself, and thus it is possible to provide an optical disk drive having a high performance and a high reliability.

In addition, the drive use circuit 2 in the optical pickup 1 according to the present invention drives the aberration correction liquid crystal element 13a, based on the aberration correction data Dh which has been obtained on the basis of the detected correction data Ddh for correcting the dynamic aberration detected by the optical system component 10, and the astigmatic data Dk for correcting the static astigmatism. Accordingly, the optical pickup corrects the static aberration and the dynamic aberration simultaneously.

In the optical disk drive and the optical pickup according to the present invention, the static aberration is assumed as astigmatism and the dynamic aberration is assumed as spherical aberration and/or coma aberration. The detected correction data is assumed as spherical correction data for correcting the spherical aberration and/or coma correction data for correcting the coma aberration.

Accordingly, the spherical correction data is used to correct the spherical aberration caused by a difference in optical disk substrate, or the coma correction data is used to correct the coma aberration caused by the tilted angle of the optical disk. Therefore, it is possible for the optical disk drive by itself to correct the spherical aberration and the coma aberration caused by the optical disk, simultaneously with the astigmatism peculiar to the pickup, and an optical disk drive having a high performance and a high reliability can be provided.

The drive use circuit provided in the optical pickup according to the present invention drives each electrode provided in the aberration correction liquid crystal element, by a drive pattern selected according to the aberration correction data. By driving the electrode as described above, it is possible to correct both the static aberration and the dynamic aberration simultaneously, using just one aberration correction liquid crystal element.

In addition, the optical disk drive and the optical pickup according to the present invention can also be configured such that an inner aberration correction data operation unit is provided within the drive use circuit. The inner aberration correction data operation unit calculates the aberration correction data based on the astigmatic data stored in the astigmatic data storage, and transmits thus calculated data to the drive use circuit. The drive use circuit drives the aberration correction liquid crystal element based on this aberration correction data.

Accordingly, it is possible to execute the correction operation in the inner aberration correction data operation unit on the pickup side, without transferring the optical system aberration data stored in the astigmatic data storage to the drive unit side. Therefore, the correction of the optical system aberration can be achieved by the pickup by itself, and data transfer within the optical disk drive is decreased, thereby reducing the loads onto the control use circuit in the drive unit.

Furthermore, the inner aberration correction data operation unit calculates the aberration correction data, based on the astigmatic data for correcting the static astigmatism stored in the astigmatic data storage and the detected correction data for correcting the dynamic aberration detected by the pickup, and then the calculated data is transmitted to the drive use circuit. The drive use circuit drives the aberration correction liquid crystal element based on this transmitted aberration correction data, and corrects both the static aberration and the dynamic aberration simultaneously.

Accordingly, the inner aberration correction data operation unit on the pickup side calculates aberration correction data, which is obtained by synthesizing the static astigmatic data peculiar to the pickup with the detected correction data for the dynamic aberration caused by the optical disk. Therefore, the correction of the static astigmatism peculiar to the pickup and the correction of the dynamic aberration caused by the optical disk can be executed by the pickup itself. Consequently, reduction of loads onto the control use circuit on the drive unit side can be achieved, as well as providing a pickup with a high performance which can complete the aberration correction by itself.

In addition, also in the configuration having the inner aberration data operation unit, the static aberration is assumed as astigmatism and the dynamic aberration is assumed as spherical aberration and/or coma aberration. Furthermore, the detected correction data is assumed as spherical correction data to correct the spherical aberration and/or coma correction data to correct the coma aberration.

Accordingly, the spherical correction data is to correct the spherical aberration caused from the difference in thickness of the optical disk, or the coma correction data is to correct the coma aberration caused by the tilted angle of the optical disk. Therefore, it is possible for the pickup itself to correct the static astigmatism peculiar to the pickup and simultaneously correct the dynamic spherical aberration and coma aberration caused by the optical disk, thereby achieving a reduction of loads onto the control use circuit on the optical disk drive side, as well as providing a pickup with a high performance, which is independently capable of completing the optical system aberration correction, spherical aberration correction, and coma aberration correction.

With the configuration above, since it is possible to store within the pickup the astigmatic data based on the optical system peculiar to the pickup and to correct the astigmatism by the pickup, an optical disk drive which is capable of implementing reproduction and recording with high degree of precision from/on the optical disk can be provided.

In addition, the drive use circuit further includes history data storage, and read/write of history data or the like from/in this history data storage is performed by the control use circuit.

With this configuration as described above, it is possible to record operation history information such as an error code at the time of operation error occurrence in the pickup, and production history information regarding the pickup. Therefore, maintenance management or the like for the optical disk drive can be simplified, and speedup in repairing a defective pickup can be achieved.

As discussed above, according to the present invention, the astigmatic data peculiar to the pickup is stored in the astigmatic data storage, and the stored astigmatic data can be easily transferred to the optical disk drive side. Therefore, for both the pickup manufacturer and the optical disk drive manufacturer, production processes are simplified, and costs are reduced, whereby an optical disk drive and optical pickup which are capable of correcting astigmatism with high reliability can be provided.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Detailed description of the preferred embodiments of the present invention will be explained in detail with reference to the accompanying drawings in the following.

Figure 1:
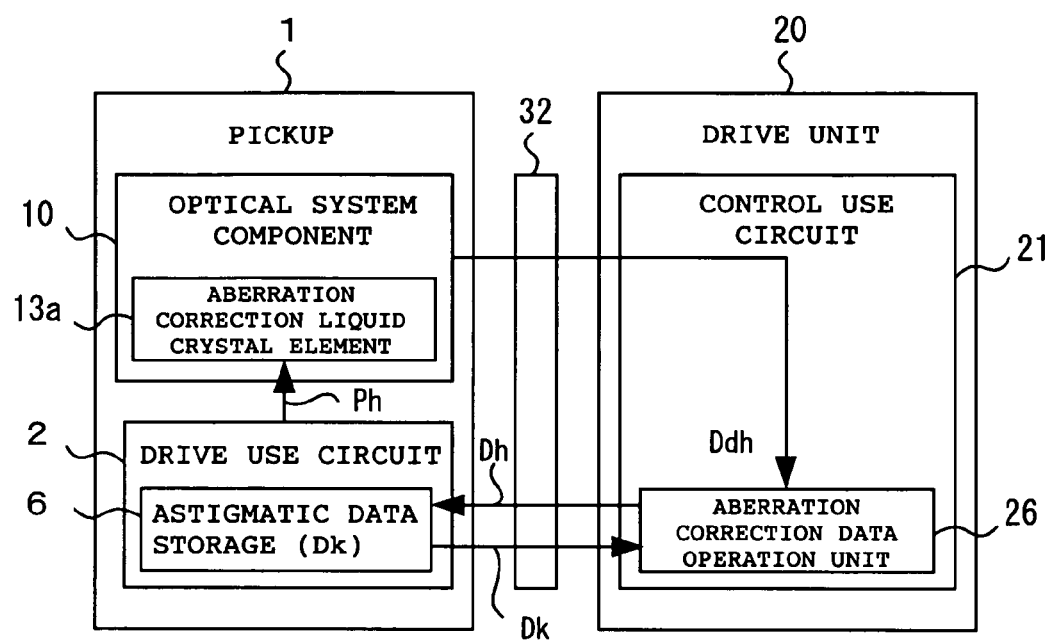
FIG. 1 is a schematic block diagram for explaining a configuration of an optical disk drive according to the present invention.
Figure 2:
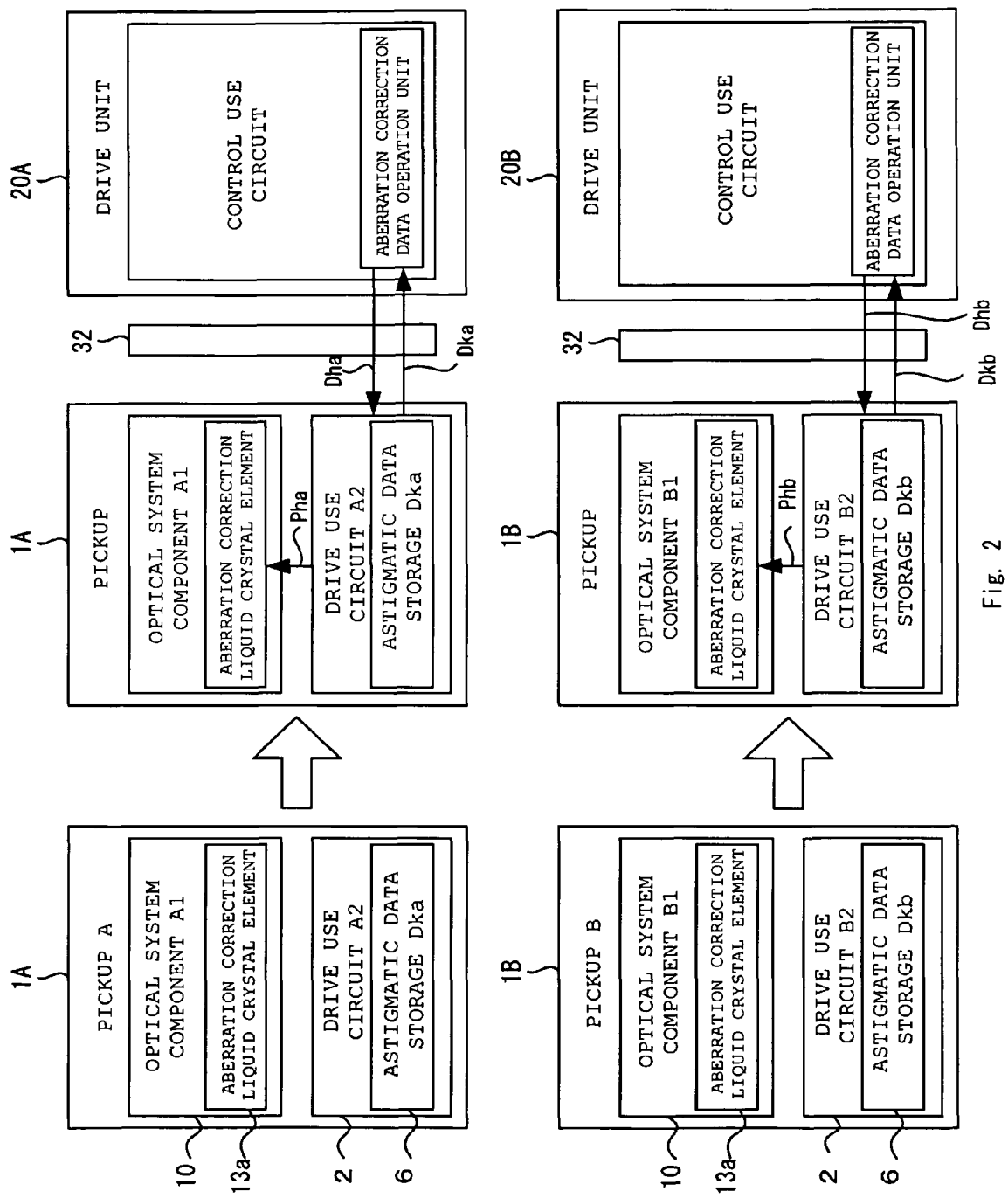
FIG. 2 is a schematic block diagram for explaining a transfer of astigmatic data to the optical disk drive side and a drive of aberration correction liquid crystal element based on the astigmatic data.
Figure 3:
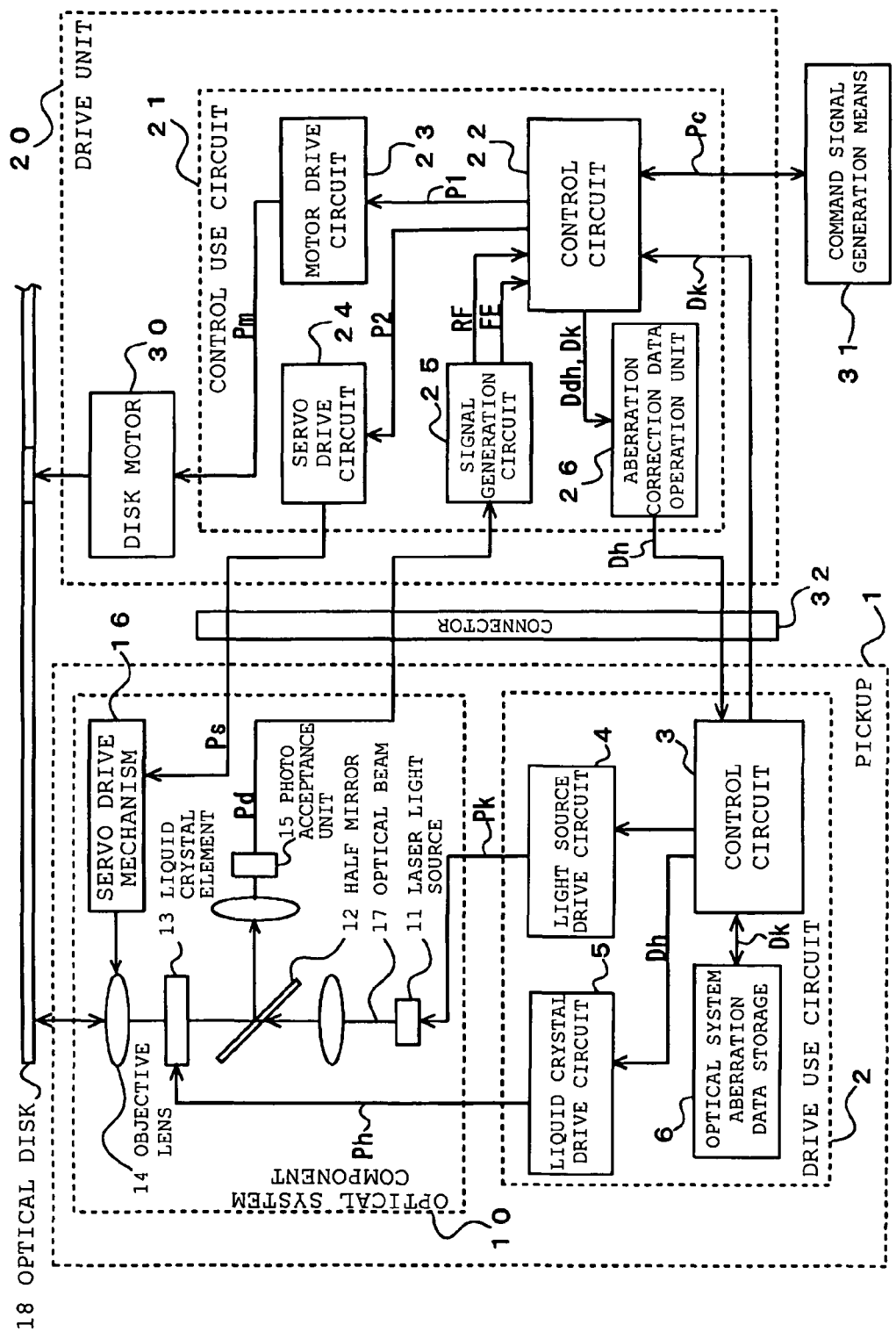
FIG. 3 is a block diagram which shows an overview of the optical disk drive in Example 1 according to the present invention.
Figure 4:
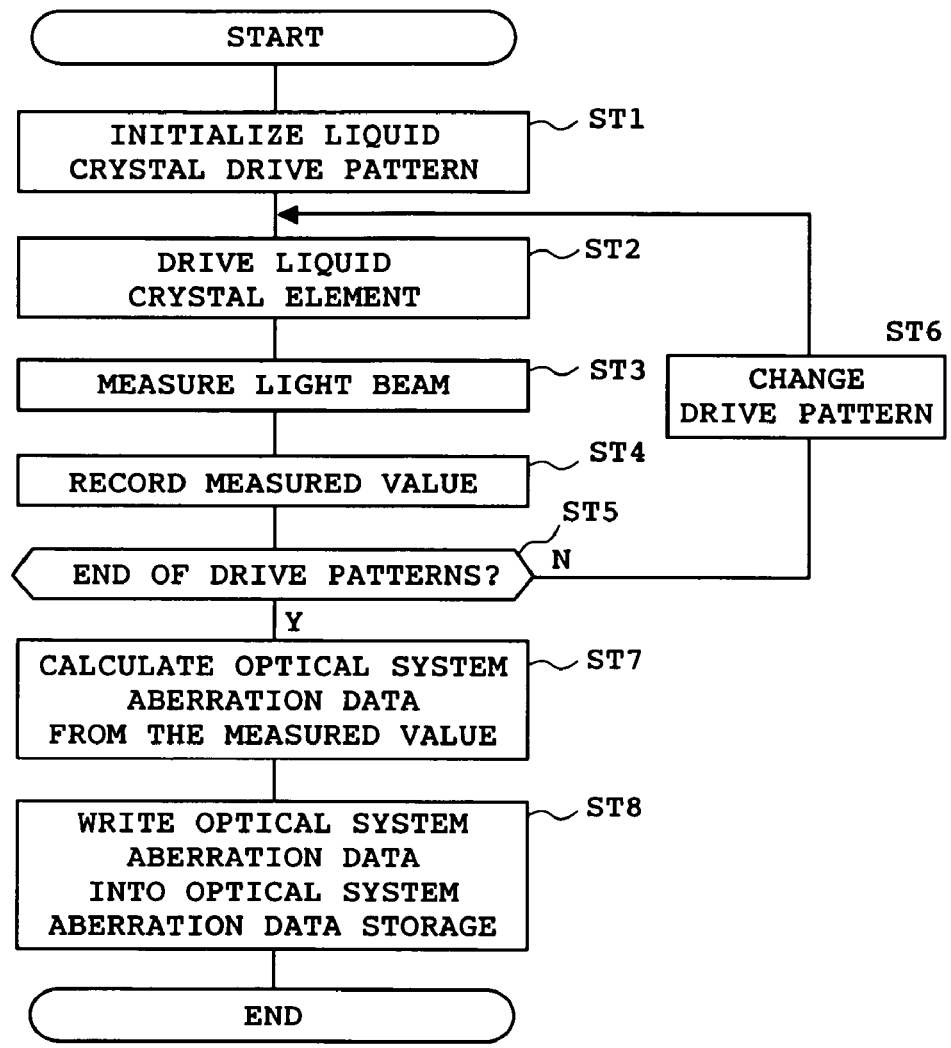
FIG. 4 is a flowchart for explaining an operation for calculating and writing the optical system aberration data in Example 1 according to the present invention.
Figure 6:
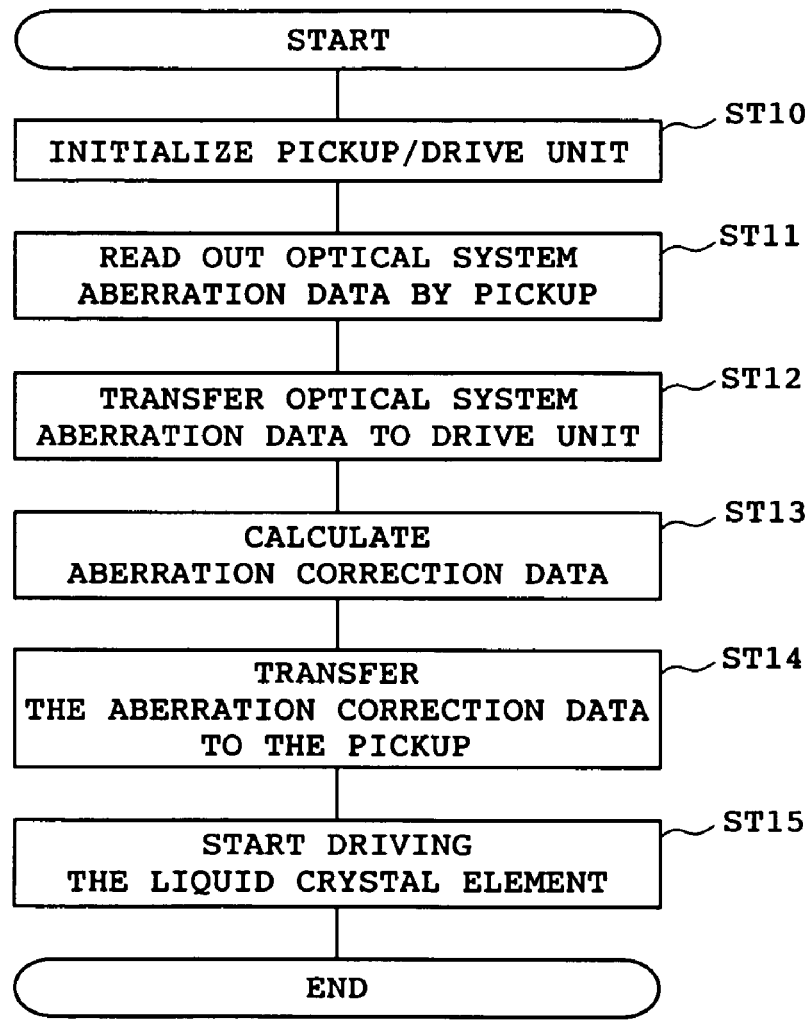
FIG. 6 is a flowchart for explaining an operation of initial aberration correction in Example 1 according to the present invention.
Figure 7:
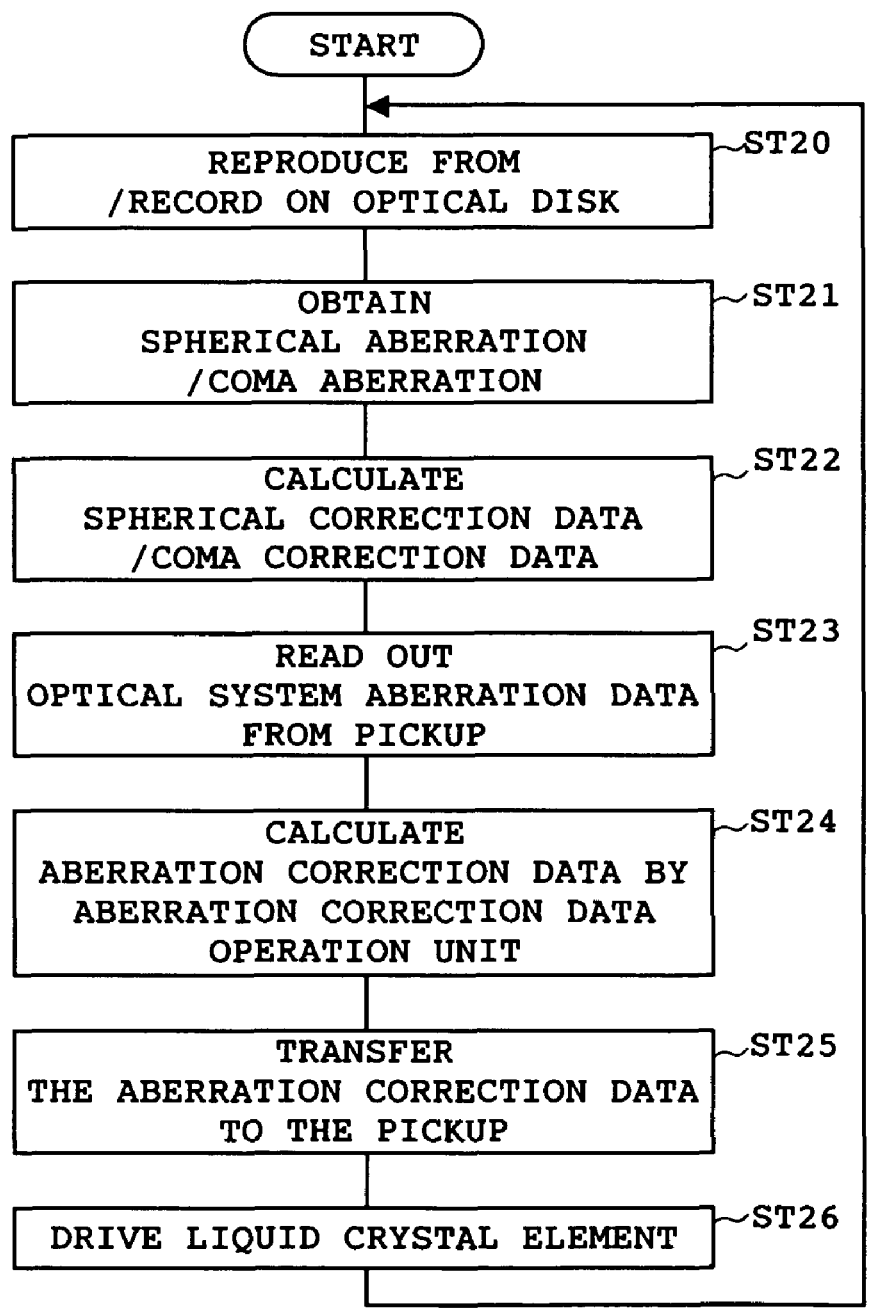
FIG. 7 is a flowchart for explaining an operation of dynamic aberration correction in Example 1 according to the present invention.
Figure 8:
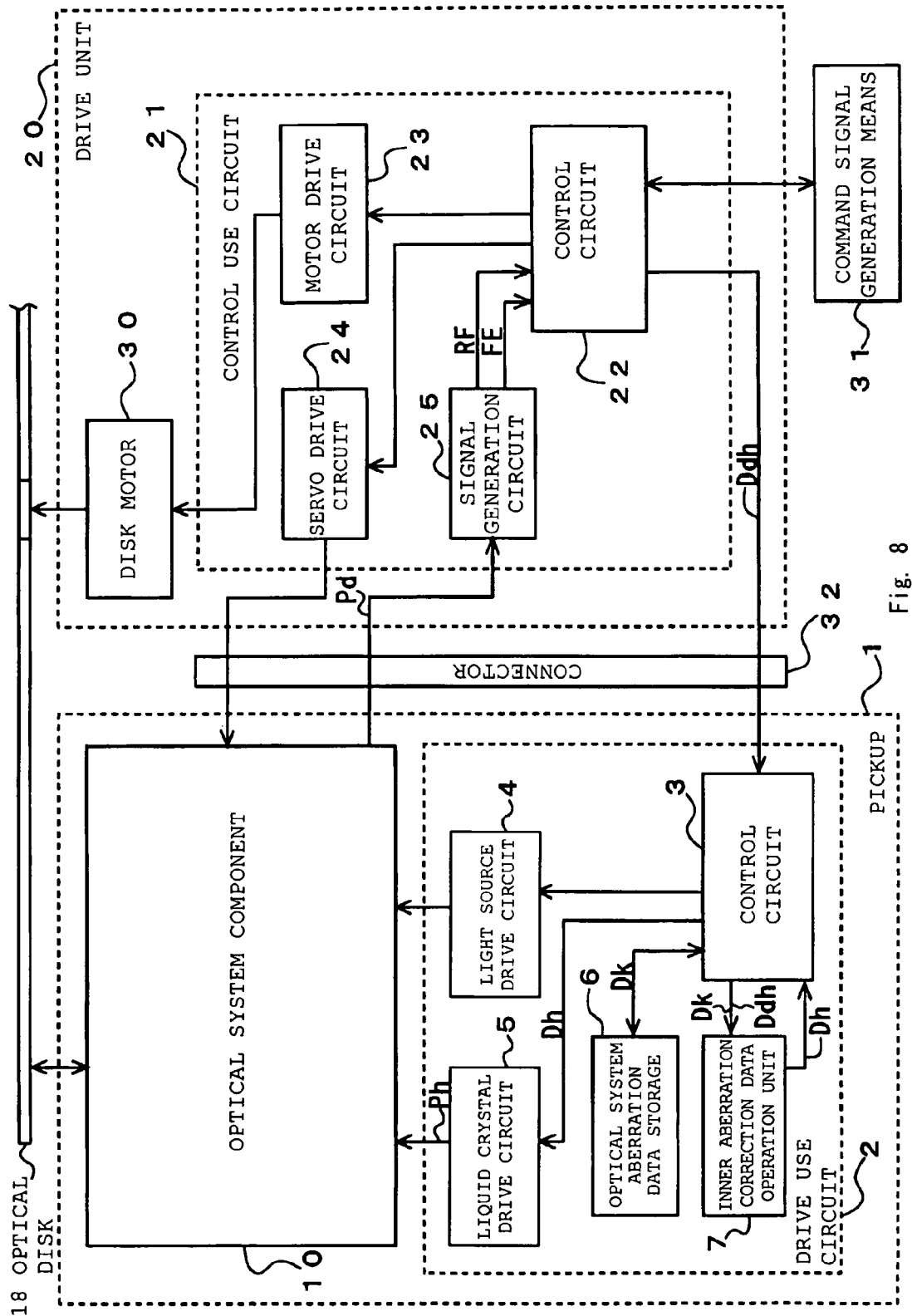
FIG. 8 is a block diagram showing an overview of the optical disk drive in Example 2 according to the present invention.
Figure 9:
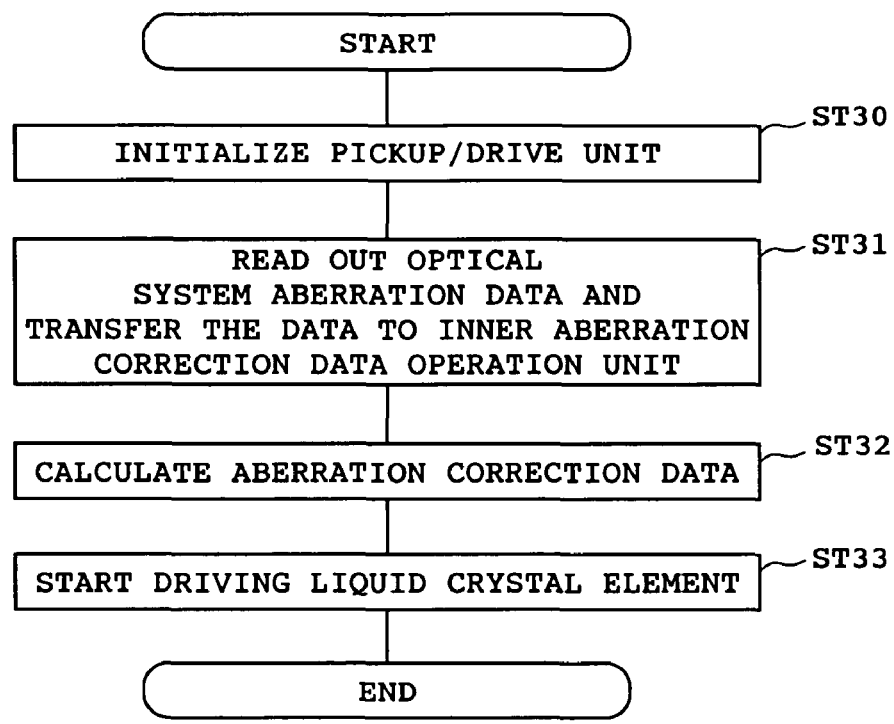
FIG. 9 is a flowchart for explaining an operation of initial aberration correction in Example 2 according to the present invention.
Figure 10:
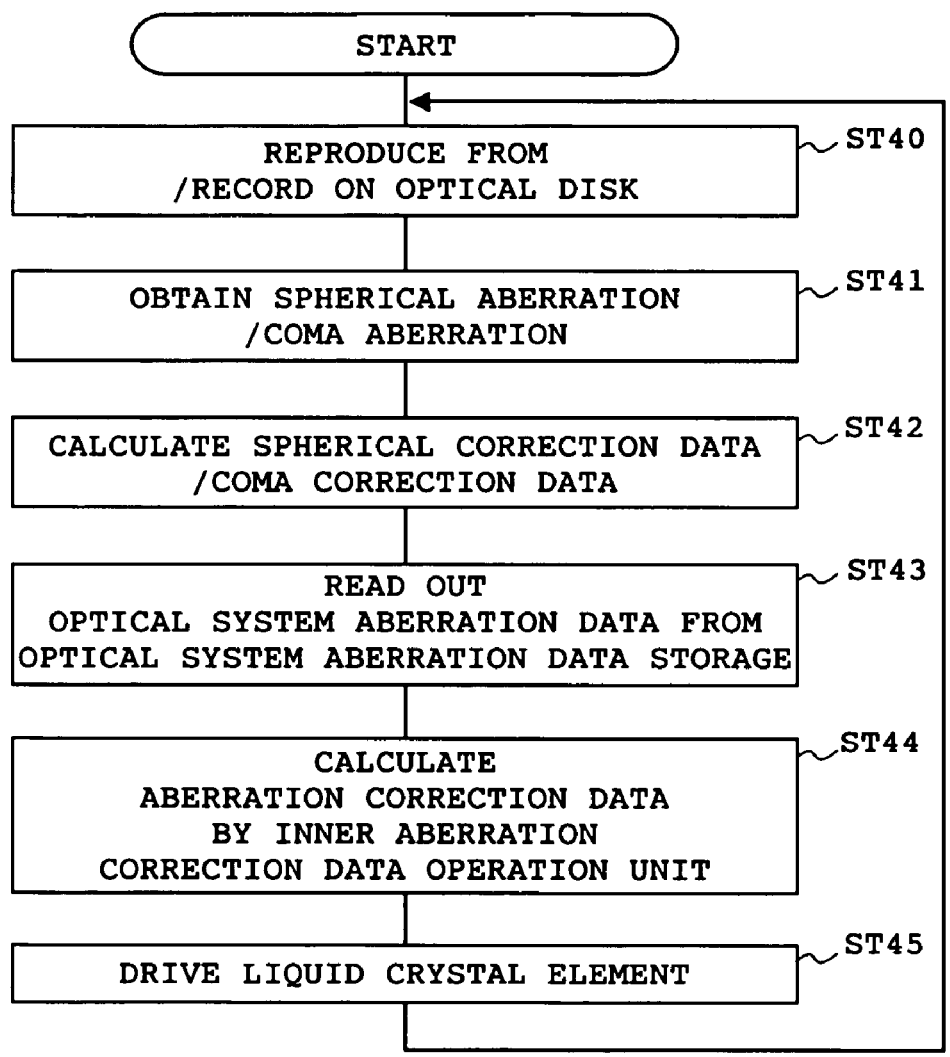
FIG. 10 is a flowchart for explaining an operation of dynamic aberration correction in Example 2 according to the present invention.
Figure 11:
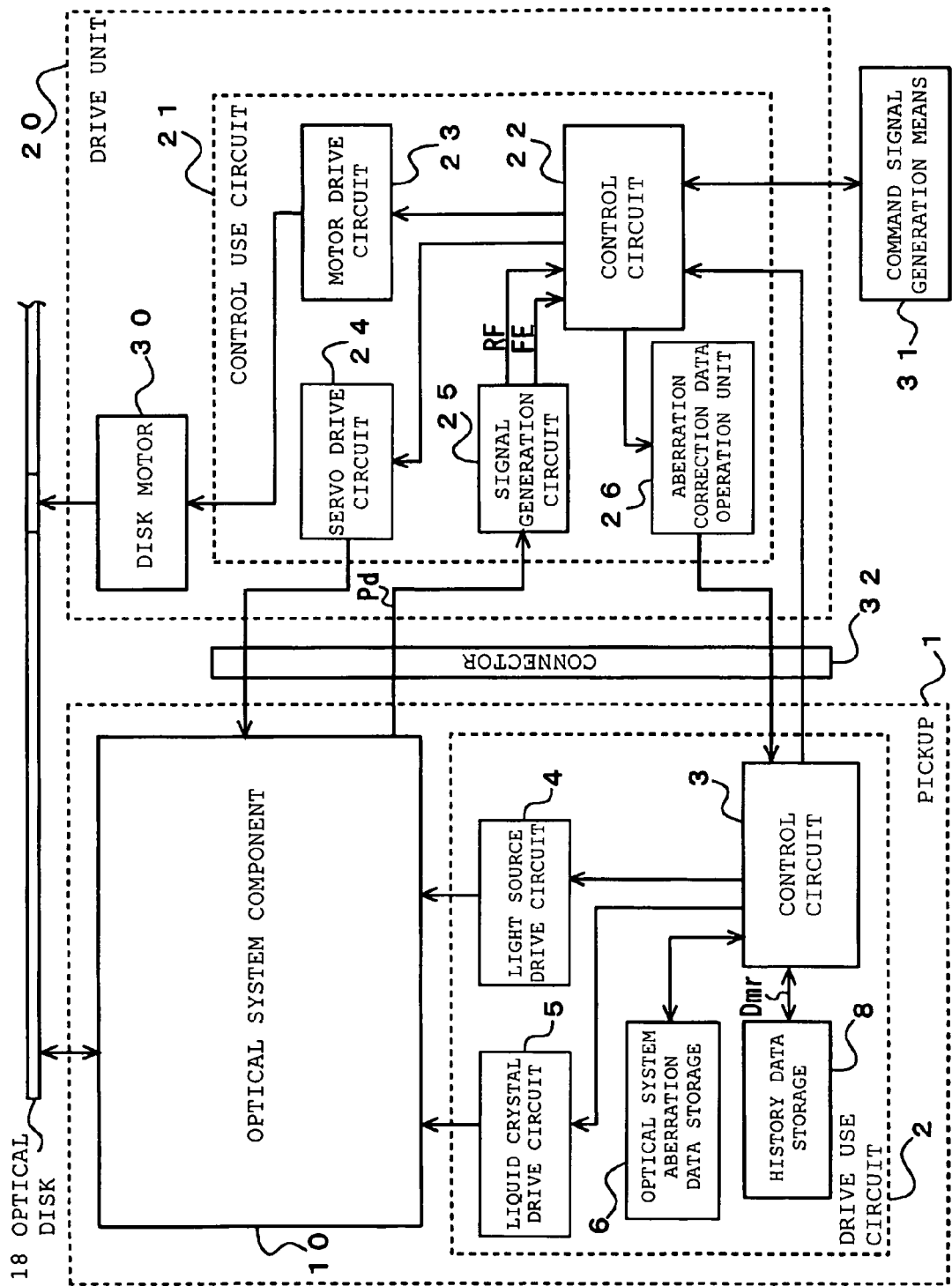
FIG. 11 is a block diagram showing an overview of the optical disk drive in Example 3 according to the present invention.
Figure 12:
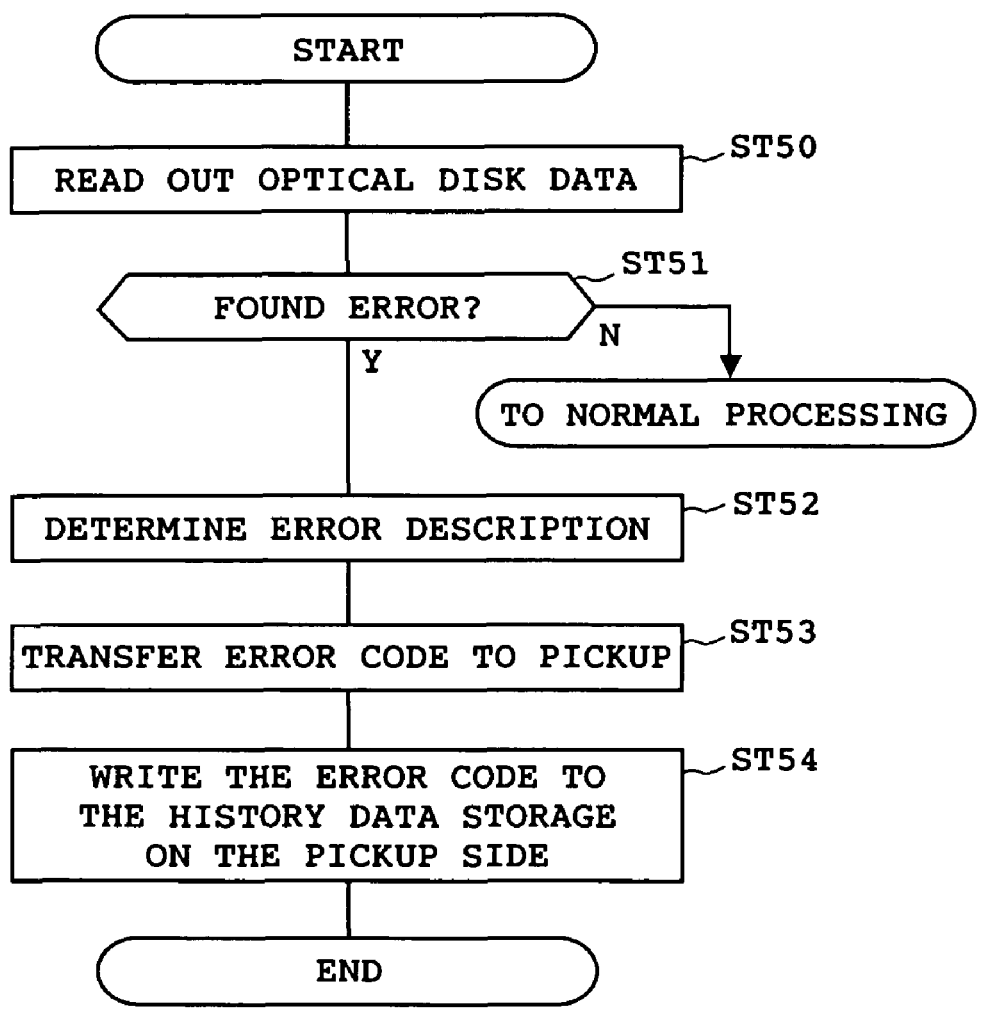
FIG. 12 is a flowchart for explaining history data writing operation in Example 3 according to the present invention.
Figure 13:
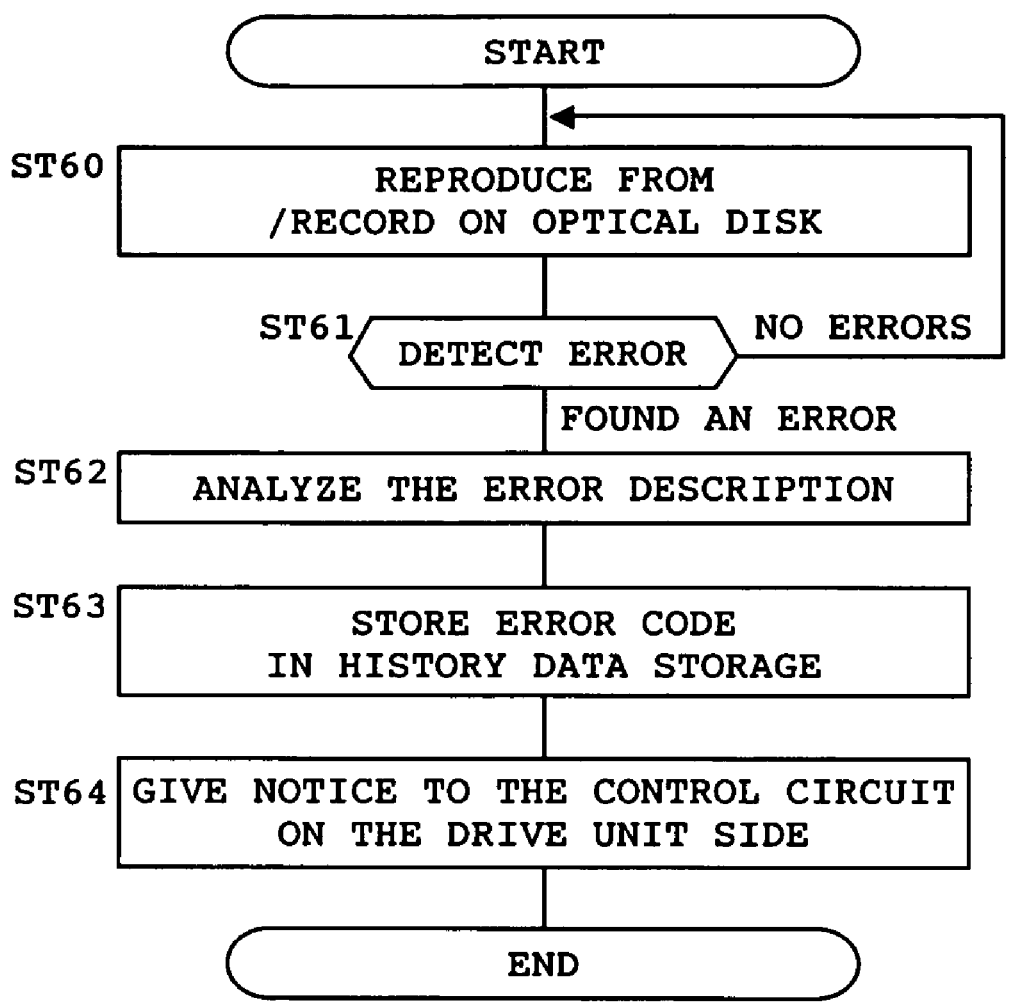
FIG. 13 is a flowchart for explaining history data storing operation according to the present invention.
Figure 14:
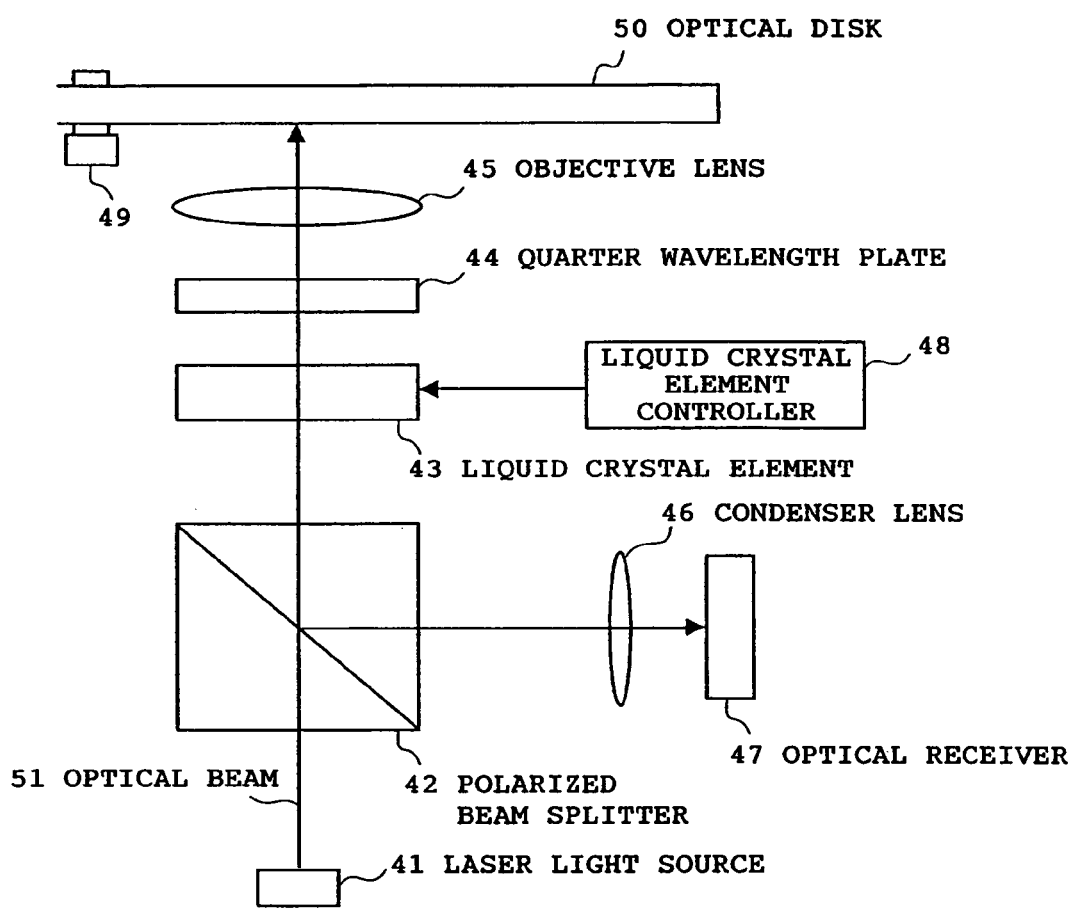
FIG. 14 is a block diagram showing a configuration of an optical pickup mounted on a conventional optical disk drive.
Figure 15:
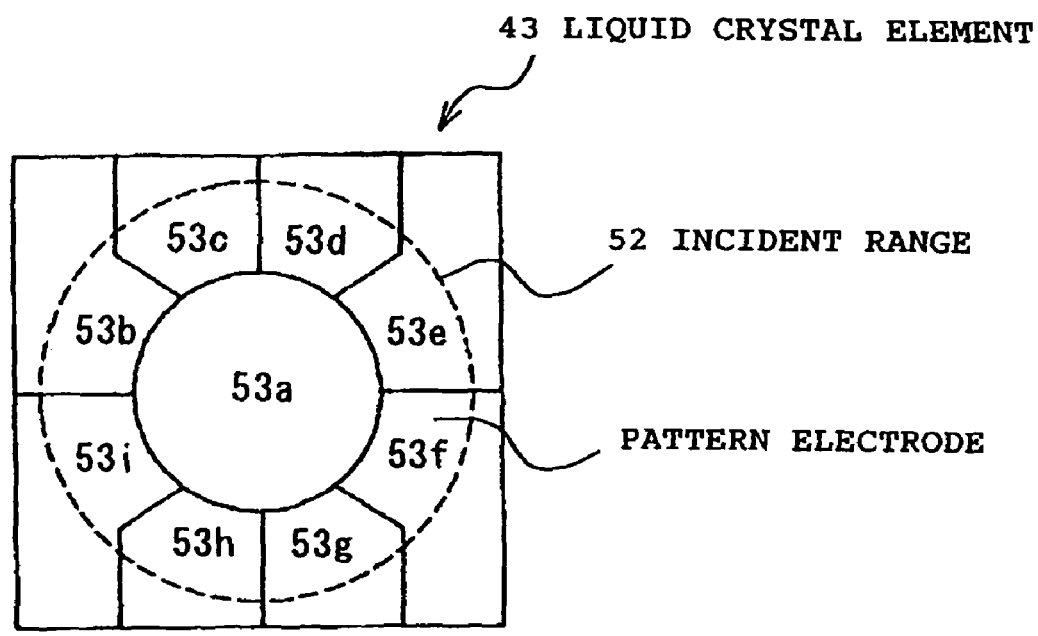
FIG. 15 is an illustration showing an electrode structure of a liquid crystal element mounted on the conventional optical pickup.
Figure 16:
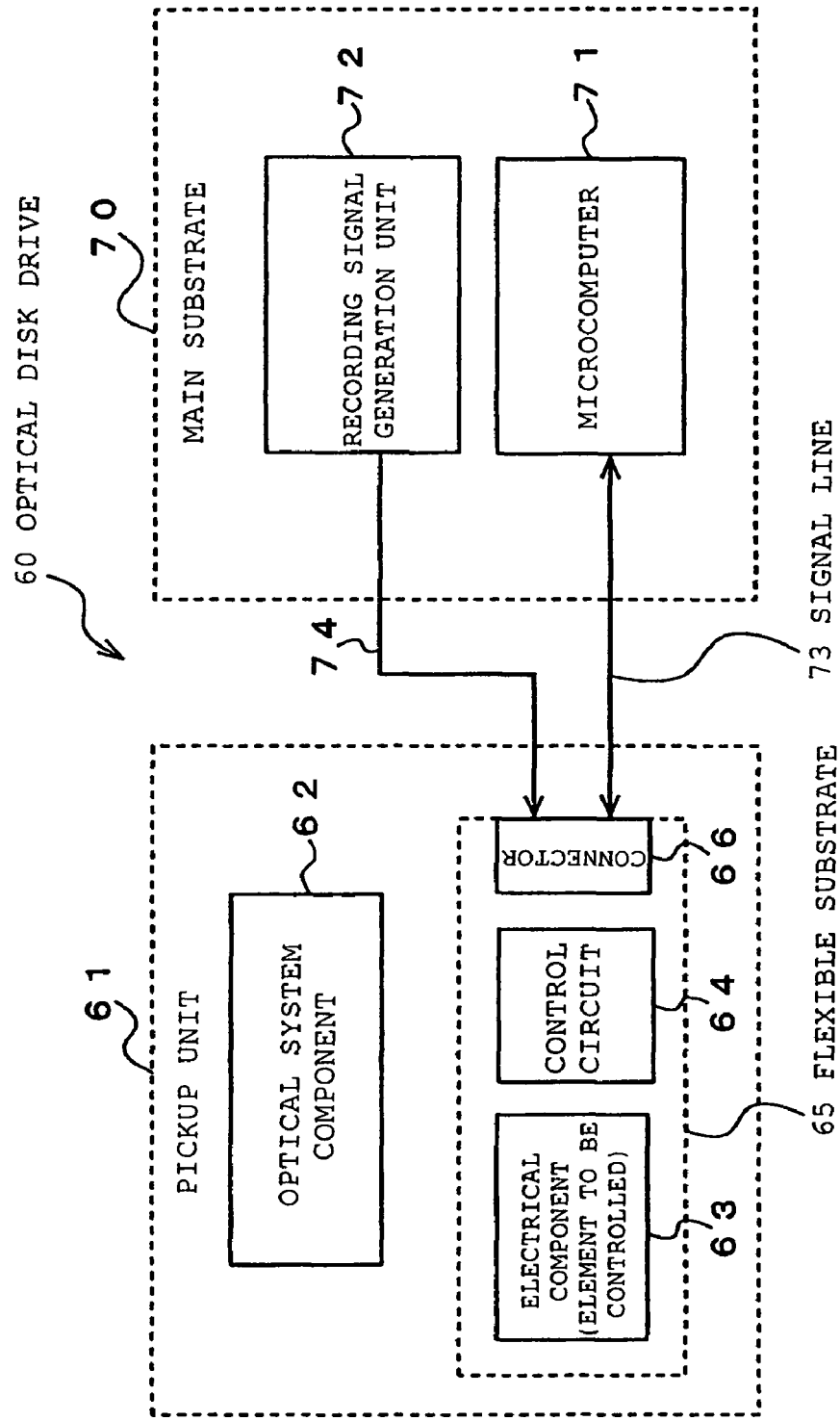
FIG. 16 is a block diagram showing a conventional pickup unit and a main substrate of the optical disk drive on which this pickup unit is mounted.
Figure 17:
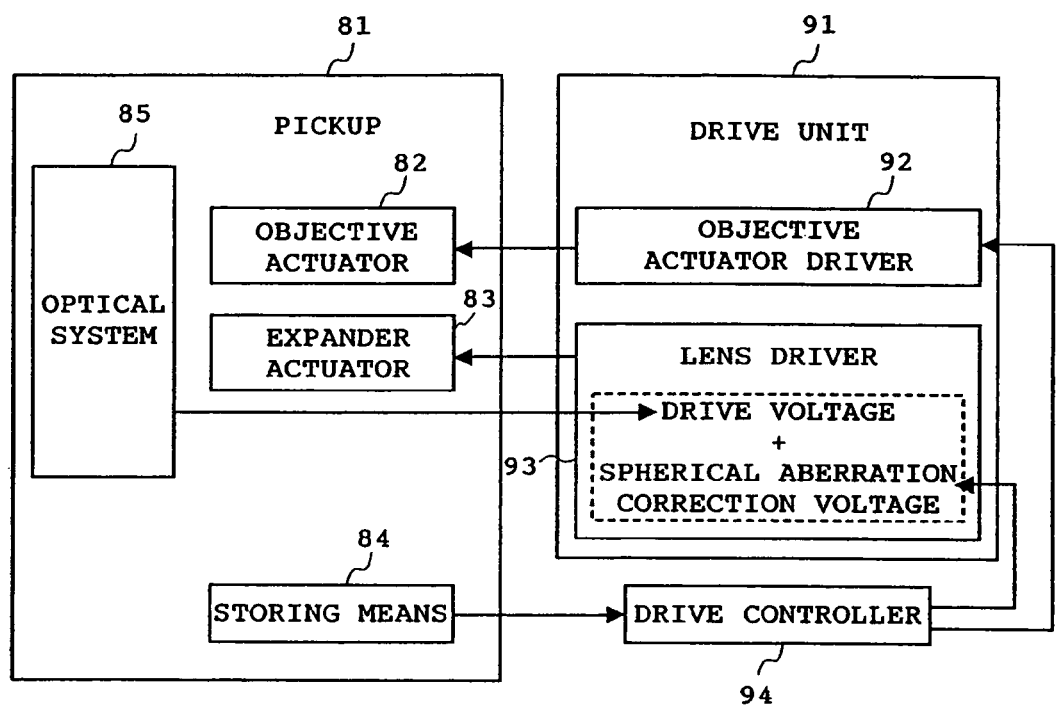
FIG. 17 is a block diagram showing a schematic configuration of the conventional optical pickup unit and a drive substrate.

FIG. 3 is a block diagram which shows an overview of the optical disk drive in Example 1 according to the present invention. FIG. 4 is a flowchart for explaining an operation for calculating and writing the optical system aberration data in Example 1 according to the present invention. FIG. 5A to FIG. 5D are illustrations for explaining electrode patterns of the liquid crystal element. FIG. 6 is a flowchart for explaining an operation of initial aberration correction in Example 1 according to the present invention. FIG. 7 is a flowchart for explaining an operation of dynamic aberration correction in Example 1 according to the present invention. FIG. 8 is a block diagram showing an overview of the optical disk drive in Example 2 according to the present invention. FIG. 9 is a flowchart for explaining an operation of initial aberration correction in Example 2 according to the present invention. FIG. 10 is a flowchart for explaining an operation of dynamic aberration correction in Example 2 according to the present invention. FIG. 11 is a block diagram showing an overview of the optical disk drive in Example 3 according to the present invention. FIG. 12 is a flowchart for explaining history data writing operation in Example 3 according to the present invention. FIG. 13 is a flowchart for explaining history data storing operation according to the present invention.

EXAMPLE 1

The configuration of the optical disk drive according to Example 1 of the present invention will be explained with reference to FIG. 3.

In FIG. 3, reference numeral 1 indicates a pickup to be mounted inside the optical disk drive according to the present invention. The pickup 1 comprises a drive use circuit 2 and an optical system component 10.

The drive use circuit 2 comprises mainly electronic circuit which drives the optical system component 10, and the electronic circuit includes control circuit 3, light source drive circuit 4, liquid crystal drive circuit 5, optical system aberration data storage 6, and the like, and it is preferable that a relatively small-scale one-chip microcomputer constitutes the drive use circuit. However, a specific integrated circuit (IC) such as gate array may serve as the drive use circuit 2. The control circuit 3 plays a central role in the drive use circuit 2, and the control circuit 3 has a function to control the light source drive circuit 4, liquid crystal drive circuit 5, optical system aberration data storage 6, and the like, according to a signal from the drive unit that will be described below.

The optical system aberration data storage 6 has a function to store optical system aberration data for correcting an optical system aberration based on the optical system peculiar to the pickup 1, and comprises a nonvolatile memory such as a flash memory. The optical system aberration data storage 6 stores astigmatic data, for instance, as the optical system aberration data. In addition, the optical system aberration data storage 6 may be built in the one-chip microcomputer constituting the control circuit 3 and the like. Alternatively, the optical system aberration data storage 6 may be mounted as an independent memory IC.

Next, the optical system component 10 comprises a laser light source 11 including laser diodes and the like, half mirror 12, liquid crystal element 13 as an aberration correction element, objective lens 14, photo acceptance unit 15, servo drive mechanism 16, and the like. Here, the laser light source 11 is driven by a light source drive signal Pk from the light source drive circuit 4 in the drive use circuit 2. The liquid crystal element 13 is divided into a plurality of electrodes for aberration correction, though they are not illustrated. Each electrode is driven by an aberration correction signal Ph, as a drive signal outputted from the liquid crystal drive circuit 5 in the drive use circuit 2.

Next, an overview of basic operation of the pickup 1 will be explained.

When the light source drive circuit 4 is controlled by the control circuit 3, the light source drive signal Pk is outputted from the light source drive circuit 4. The light source drive signal Pk drives the laser light source 11 and the laser light source 11 emits a light beam 17 being a laser beam. After the light beam 17 passes through the half mirror 12, the light beam launches into the liquid crystal element 13, and further collected on the information recording surface of the optical disk 18 by the objective lens 14.

The liquid crystal element 13 is arranged in the passage area of the light beam 17. Each electrode (not shown) of this liquid crystal element 13 is driven by the aberration correcting signal Ph from the liquid crystal drive circuit 5. When the light beam 17 passes through the partitioned areas driven by each electrode, a phase difference is given to the light beam based on the aberration correction signal Ph. With the phase difference thus given, it is possible to correct the optical system aberration caused by the optical system peculiar to the pickup 1.

In addition, the light beam 17 reflected from the information recording surface of the optical disk 18 passes again through the objective lens 14 and the liquid crystal element 13. Then, the half mirror 12 changes the optical path of the light beam, and it is collected onto the photo acceptance unit 15. The photo acceptance unit 15 converts the intensity of the reflected light beam 17 into electrical signals, and outputs a detection signal Pd. The servo drive mechanism 16 operates according to a signal from the drive unit as described below, moves the objective lens 14 in the radial direction and the thickness direction of the optical disk 18, and executes tracking and focusing adjustment. In addition, the optical system aberration data storage 6 stores in advance optical system aberration data Dk peculiar to the pickup 1, the data having been measured at the time of manufacturing the pickup 1.

Next, a main unit side of the optical disk drive will be explained.

Reference numeral 20 indicates a drive unit constituting the main unit of the optical disk drive, and it comprises control use circuit 21, disk motor 30 which rotationally drives the optical disk 18, and the like. The control use circuit 21 comprises a control circuit 22 which controls the drive unit 20 entirely, motor drive circuit 23 which drives the disk motor 30, servo drive circuit 24 which drives the servo drive mechanism 16 on the pickup 1 side, signal generation circuit 25 in which a detection signal Pd is inputted, aberration correction data operation unit 26 which calculates aberration correction, and the like. Here, it is to be noted that a microcomputer may constitute a part of or the whole of the control use circuit 21. Alternatively, a specific IC such as gate array may constitute the control use circuit 21. Reference numeral 31 indicates a command signal generation means which includes a personal computer or the like which controls the optical disk drive. Reference numeral 32 indicates a connector which electrically connects the pickup 1 and the drive unit 20.

Next, an overview of basic operation of the drive unit 20 will be explained.

The control circuit 22 outputs a motor control signal P1, and controls the motor drive circuit 23. The motor drive circuit 23 outputs a motor drive signal Pm to drive the disk motor 30, thereby rotating the optical disk 18. The control circuit 22 outputs a servo control signal P2 as well, and controls the servo drive circuit 24. The servo drive circuit 24 outputs a servo drive signal Ps to drive the servo drive mechanism 16 on the pickup 1 side, and executes tracking and focusing adjustment for the optical disk 18. In addition, the optical aberration data Dk peculiar to the pickup 1 stored in the optical system aberration data storage 6 is inputted into the control circuit 22 via the control circuit 3 on the pickup 1 side, and the control circuit 22 outputs the data Dk together with the detected correction data Ddh to the aberration correction data operation unit 26 as described below.

The optical system aberration data Dk and the detected correction data Ddh are inputted into the aberration correction data operation unit 26 and the aberration correction data operation unit 26 calculates aberration correction data Dh, and then outputs thus calculated data Dh to the pickup 1. A detection signal Pd from the pickup 1 is inputted into the signal generation circuit 25, and the signal generation circuit 25 outputs to the control circuit 22 a reproduction signal RF and an error signal FE including the focus error signal. Here, the error signal FE is a signal to be outputted in such a case where the reproduction signal RF is out of focus. When this error signal FE is inputted into the control circuit 22, generally, the control circuit 22 controls the servo drive mechanism 16 and the liquid crystal element 13 to execute focusing. Furthermore, a command signal Pc is inputted into the control circuit 22 from the command signal generation means 31, and the control circuit 22 executes an overall control of the drive unit 20 based on this command signal Pc.

Next, with reference to FIG. 4, overview of calculating and writing steps will be explained as to the optical system aberration data peculiar to the pickup 1.

The steps above are performed when a pickup manufacturer manufactures a pickup. Those steps can be carried out by use of a pickup evaluation apparatus (not illustrated) which is capable of measuring a type of wavefront aberration, aberration amount, and the like, at a light condensing spot of the light beam 17 emitted from the pickup 1 (see FIG. 3), or an apparatus pursuant to this pickup evaluation apparatus.

When the pickup 1 is set in the pickup evaluation apparatus and processing starts, the control circuit 3 included in the drive use circuit 2 of the pickup 1 is initialized, and initial setting is performed as to the liquid crystal drive pattern for driving the liquid crystal element 13. There are prepared in advance multiple drive patterns for the liquid crystal element 13 to carry out aberration correction. When the initialization is performed, one drive pattern is selected from the multiple drive patterns (Flow ST1).

Figure 5:
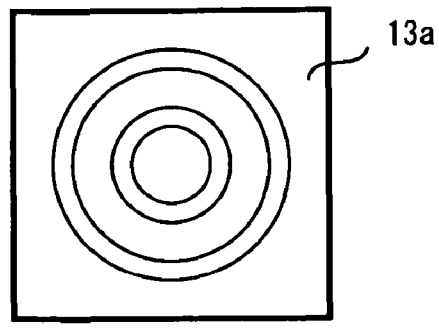
FIG. 5A to FIG. 5D are illustrations for explaining electrode patterns of the liquid crystal element.
Figure 5:
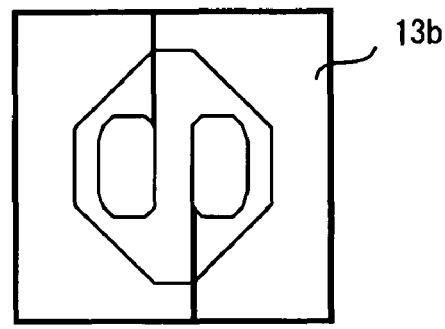
Figure 5:
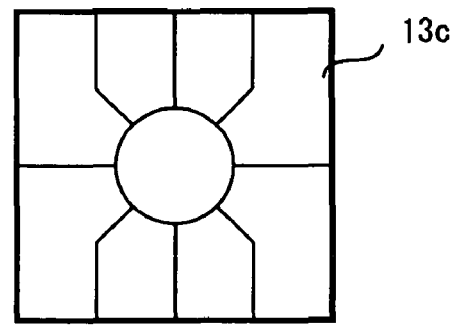
Figure 5:
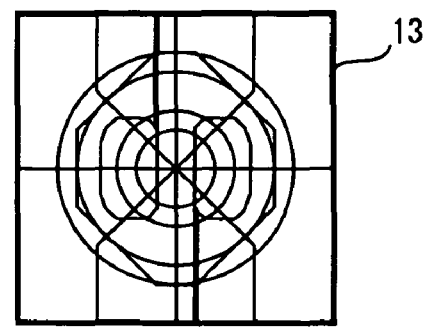

FIG. 5A to FIG. 5D are illustrations for explaining the electrode patterns of the liquid crystal element used for aberration correction. FIG. 5A is an example of electrode pattern which corrects a dynamic spherical aberration caused by errors or the like in board thickness of the optical disk. FIG. 5B is an example of electrode pattern which corrects dynamic coma aberration caused by a tilt or the like of the optical disk. FIG. 5C is an example of electrode pattern which corrects a static aberration peculiarly provided in the optical system caused by an error or the like in producing the optical pickup.

FIG. 5D shows an electrode pattern of the liquid crystal element, which is formed by combining the electrode patterns as shown in FIG. 5A to FIG. 5C.

Setting of the drive pattern is performed by selecting any one of the electrode patterns of FIG. 5A to FIG. 5C, from the electrode pattern as shown in FIG. 5D, according to the type of aberration as a correcting target. Each electrode is driven by the aberration correction signal Ph outputted from the liquid crystal drive circuit 5 in the drive use circuit 2.

Next, the liquid crystal drive circuit 5 in the pickup 1 outputs aberration correction signal Ph based on the selected liquid crystal drive pattern, and drives the liquid crystal element 13 (Flow ST2). In other words, the liquid crystal element 13 is driven based on the selected liquid crystal drive pattern, and it gives a specific phase difference to the light beam 17 which passes through the liquid crystal element 13.

Next, the control circuit 3 controls the light source drive circuit 4 to output a light source drive signal Pk, and allows the laser light source 11 to emit the light beam 17. The light beam 17 passes through the half mirror 12, the liquid crystal element 13, and the objective lens 14, and the light beam is collected onto the aforementioned pickup evaluation apparatus. The pickup evaluation apparatus measures aberration amount or the like of the light beam 17 thus collected (Flow ST3).

As described above, the light beam 17 emitted from the laser light source 11 is given a phase difference, according to the partitioned areas of the liquid crystal element 13 having been selected by the liquid crystal drive pattern. The pickup evaluation apparatus measures the light beam 17 which is varied according to the liquid crystal drive pattern thus selected.

Next, the pickup evaluation apparatus stores thus measured value such as aberration amount into a memory circuit internally provided (not illustrated) (Flow ST4).

Next, the pickup evaluation apparatus determines whether or not selection of all the liquid crystal drive patterns is completed and the liquid crystal drive pattern currently selected is the last liquid crystal drive pattern (Flow ST5). If it is determined negatively, the process proceeds to the flow ST6. If it is determined positively, the process proceeds to the flow ST7.

If it is determined negatively in Flow ST5, the pickup evaluation apparatus controls the control circuit 3 in the pickup 1, and selects the subsequent liquid crystal drive pattern, and returns to the flow ST2 (Flow ST6). The flow ST2 to flow ST6 are repeated until the selection of all the liquid crystal drive patterns prepared in advance is completed, and the light beam 17 corresponding to each liquid crystal drive pattern is measured, and stores thus measured value into the memory circuit in the pickup evaluation apparatus.

Next, if it is determined positively in the flow ST5, the pickup evaluation apparatus reads out measured values being stored, and calculates the direction and size of the optical system aberration (Flow ST7).

Next, the pickup evaluation apparatus transfers the optical system aberration data thus calculated to the optical system aberration data storage 6 built in the drive use circuit 2 in the pickup 1, and stores the data therein (Flow ST8). According to the steps as described above, when the pickup is manufactured, the pickup measures the optical system aberration data such as astigmatism peculiar to the pickup and stores the data in the built-in optical system aberration data storage. Therefore, at the time of shipping the pickup, additional operations are not necessary any more, such as an operation for attaching the optical system aberration data in a form of bar code onto a packaging material or the like, and an operation for generating optical system aberration data table being associated with the serial number of the pickup, thereby simplifying the pickup manufacturing process.

It is to be noted that the optical system aberration measured in those steps is generally an astigmatism based on the optical system peculiar to the pickup, but it may include coma aberration or spherical aberration. Specific case examples where the coma aberration or spherical aberration is included in the optical system aberration, for instance, may be a case where the objective lens 14 included in the optical system component 10 has a shape with coma aberration or spherical aberration, a case where the objective lens 14 is added with the coma aberration since the objective lens 14 is installed in such a manner as being tilted with respect to the optical axis, a case where the coma aberration is constantly added since a disk motor shaft which rotationally drives the optical disk is arranged in such a manner as being tilted with respect to the design standard, a case where the same spherical aberration is constantly added, since a member is arranged so that the optical disk is mounted on a position deviated from a focused position of the light beam collected by the objective lens 14.

Next, in the steps of FIG. 4 as described above, the optical system aberration data peculiar to the pickup is stored in the optical system aberration data storage 6 internally provided. Thereafter, the pickup is shipped to the optical disk drive manufacturer. The optical disk drive manufacturer carries out the initial aberration correction after the pickup is built in the drive unit 20. Hereinafter, with reference to FIG. 6, operations of the initial aberration correction will be explained.

In FIG. 6, when the operation is started, the control circuit 22 in the drive unit 20 executes an initialization process, and initializes the drive unit 20. The control circuit 3 in the pickup 1, which is mounted on the drive unit 20, is also subjected to the initialization process, and the pickup 1 is initialized (Flow ST10).

Next, the control circuit 3 in the pickup 1 reads out optical system aberration data Dk peculiar to the pickup 1 previously stored in the optical system aberration data storage 6, and temporarily stores the data inside the control circuit 3 (Flow ST11).

Next, the control circuit 22 in the drive unit 20 transfers the optical system aberration data Dk read out by the control circuit 3 in the pickup 1 to the aberration correction data operation unit 26 in the drive unit 20 (Flow ST12).

Next, the control circuit 22 in the drive unit 20 controls the aberration correction data operation unit 26, and calculates aberration correction data Dh from the optical system aberration data Dk thus obtained (Flow ST13).

Next, the control circuit 22 in the drive unit 20 transfers the aberration correction data Dh calculated by the aberration correction data operation unit 26 to the control circuit 3 in the pickup 1 (Flow ST14).

Next, the control circuit 3 in the pickup 1 transfers the aberration correction data Dh being inputted to the liquid crystal drive circuit 5. The liquid crystal drive circuit 5 outputs aberration correction signal Ph to the liquid crystal element 13, based on the aberration correction data Dh. The aberration correction signal Ph as an initial value drives the liquid crystal element 13, and the liquid crystal element 13 gives a phase difference to the light beam 17 and starts the aberration correction (Flow ST15). According to the operation flow as described above, the optical disk drive executes an initial aberration correction based on the optical system aberration data Dk peculiar to the pickup 1, which is previously stored in the optical system aberration data storage 6 in the pickup 1, and starts reproduction or recording from/on the optical disk 18.

Next, with reference to FIG. 7, an operation of dynamic aberration correction will be explained, which is performed while the optical disk drive is actually executing reproduction or recording from/on the optical disk, after the initial aberration correction in the pickup 1 is performed according to the operation flow of FIG. 6 as described above.

In FIG. 7, the control circuit 22 in the drive unit 20 controls the pickup 1 to execute the reconstruction or recording operation from/on the optical disk 18. The pickup 1 outputs a detection signal Pd (Flow ST20).

Next, the control circuit 22 in the drive unit 20 obtains from a reproduction signal RF and an error signal FE as outputs from the signal generation circuit 25, either spherical aberration data caused by the difference in substrate thickness of the optical disk 18 or coma aberration data caused by the tilted angle of the optical disk 18, or both data items, and the stores the data (Flow ST21).

Next, the control circuit 22 in the drive unit 20 calculates, based on thus obtained spherical aberration data or the coma aberration data, detected correction data Ddh including either the spherical correction data or the coma correction data, or both data items, and transfers thus calculated data to the aberration correction data operation unit 26 (Flow ST22).

Next, the control circuit 22 in the drive unit 20 controls the pickup 1 to read out optical system aberration data Dk peculiar to the pickup 1, the data being stored in the optical system aberration data storage 6, and transfers the readout data to the aberration correction data operation unit 26 (Flow ST23).

Next, the aberration correction data operation unit 26 synthesizes the detected correction data Ddh including either the spherical correction data or the coma correction data, or including both of these data items, with the optical system aberration data Dk, and then executes arithmetic processing to calculate aberration correction data Dh (Flow ST24).

Next, the control circuit 22 in the drive unit 20 transfers the aberration correction data Dh having been calculated by the aberration correction data operation unit 26 to the control circuit 3 in the pickup 1 (Flow ST25).

Next, the control circuit 3 in the pickup 1 transfers the aberration correction data Dh thus inputted to the liquid crystal drive circuit 5. The liquid crystal drive circuit 5 outputs an aberration correction signal Ph as a drive signal to the liquid crystal element 13, based on the aberration correction data Dh. The liquid crystal element 13 is driven based on the aberration correction signal Ph, gives a phase difference to the light beam 17, and then the aberration correction is executed (Flow ST26).

Next, the control circuit 22 in the drive unit 20 repeats the flow ST20 to flow ST26 at a constant frequency, during when reproducing or recording from/on the optical disk is operated, and the aberration correction of the pickup 1 is dynamically performed. Here, an optical system aberration such as astigmatism peculiar to the pickup 1 is not changed while reproducing or recording from/on the optical disk is operated. On the other hand, the spherical aberration caused by the difference in substrate thickness of the optical disk 18 and coma aberration caused by the tilted angle of the optical disk 18 are constantly changing during when reproducing or recording from/on the optical disk is operated. Therefore, by performing the dynamic aberration correction flow as shown in FIG. 7, it is possible to dynamically execute the spherical aberration correction and the coma aberration correction including correction of the astigmatism peculiar to the pickup 1, during when reproducing or recording from/on the optical disk is operated.

As described above, with the optical disk drive according to the present invention, optical system aberration data caused by the pickup and peculiar thereto, is stored in the optical system aberration data storage 6 built in the pickup 1. Therefore, the optical system aberration data is easily read out by the drive unit 20, resulting in that the production process is simplified and costs are reduced both in a pickup manufacturer and in an optical disk drive manufacturer, and it is further possible to achieve an aberration correction of the optical system with a high degree of reliability.

In addition, the optical system aberration data (astigmatic data) read out from the optical system aberration data storage 6 and the detected correction data which corrects the spherical aberration and the coma aberration caused by the optical disk are synthesized to calculate aberration correction data. Then, the correction of the optical system aberration peculiar to the pickup (correction of astigmatism) and the correction of the aberration caused by the optical disk are simultaneously and dynamically executed. Therefore, reproducing operation and recording operation from/on the optical disk can be achieved constantly with high precision, and it is possible to provide an optical disk drive with a high degree of reliability.

EXAMPLE 2

Next, with reference to FIG. 8, a configuration of Example 2 of the optical disk drive according to the present invention will be explained. In Example 2, aberration correction data operation unit is provided on the pickup side, thereby allowing the pickup itself to perform aberration correction. In Example 2, the same constituents as shown in the diagram (FIG. 3) of Example 1 are labeled the same, and a part of tedious explanations shall not be made.

In FIG. 8, reference numeral 1 indicates a pickup to be mounted inside the optical disk drive according to the present invention. The pickup 1 comprises a drive use circuit 2 and an optical system component 10. As in the case of Example 1, the drive use circuit 2 comprises control circuit 3, light source drive circuit 4, liquid crystal drive circuit 5, optical system aberration data storage 6, and the like. Reference numeral 7 indicates an inner aberration correction data operation unit which calculates aberration correction data, and it is built in the drive use circuit 2 in the pickup 1. Here, the inner aberration correction data operation unit 7 may be built in a relatively small-scale one-chip microcomputer comprising the drive use circuit 2. Alternatively, a specific IC such as gate array may constitute the inner aberration correction data operation unit. Since the internal structure of the optical system component 10 in the pickup 1 is the same as Example 1, it will not be tediously explained.

Next, a main unit of the optical disk drive will be explained. Reference numeral 20 indicates a drive unit comprising the main unit of the optical disk drive. The drive unit 20 includes control use circuit 21, disk motor 30 to rotationally drive the optical disk 18, and the like. As is the case with Example 1, the control use circuit 21 includes a control circuit 22 which controls the drive unit 20 entirely, motor drive circuit 23 which drives the disk motor 30, servo drive circuit 24 which drives the servo drive mechanism 16 on the pickup 1 side, signal generation circuit 25 into which a detection signal Pd is inputted from the pickup 1, and the like. In Example 2, the aberration correction data operation unit 7, which calculates the aberration correction, is provided on the pickup 1 side, as described above. Therefore, this operation unit is not positioned in the control use circuit 21 of the drive unit 20.

Next, with reference to FIG. 9, initial aberration correction operation of the optical disk drive in Example 2 according to the present invention will be explained.

Here, as described with reference to FIG. 4 of Example 1, the pickup 1 mounted on the optical disk drive in Example 2 stores in the internally provided optical system aberration data storage 6, optical system aberration data (astigmatic data) peculiar to the pickup, and thereafter, the pickup 1 is shipped to the optical disk drive manufacturer. Then, the pickup 1 shipped to the optical disk drive manufacturer is incorporated into the drive unit 20, and then, the initial aberration correction is executed thereon.

In FIG. 9, when the process is started, firstly, the control circuit 22 in the drive unit 20 executes initialization process and initializes the drive unit 20. Furthermore, the control circuit 3 in the pickup 1 mounted on the drive unit 20 also executes the initializing process, and initializes the pickup 1 (Flow ST30).

Next, the control circuit 3 in the pickup 1 reads out the optical system aberration data Dk (astigmatic data) peculiar to the pickup 1, which is previously stored in the optical system aberration data storage 6, and transfers the data to the inner aberration correction data operation unit 7 built in the pickup 1 (Flow ST31).

Next, the inner aberration correction data operation unit 7 built in the pickup 1 calculates aberration correction data Dh from the optical aberration data Dk thus obtained, and transfers thus calculated aberration correction data to the control circuit 3 (Flow ST32).

Next, the control circuit 3 in the pickup 1 transfers the aberration correction data Dh being calculated to the liquid crystal drive circuit 5. The liquid crystal drive circuit 5 outputs aberration correction signal Ph to the liquid crystal element 13 in the optical system component 10 based on the aberration correction data Dh. The liquid crystal element 13 is driven based on the aberration correction signal Ph as an initial value. Then, the liquid crystal element 13 gives a phase difference to the light beam 17, and then starts the aberration correction (Flow ST33).

According to the operation flow as described above, the optical disk drive executes the initial aberration correction based on the optical system aberration data Dk (astigmatic data) peculiar to the pickup 1, which is previously stored in the optical system aberration data storage 6 in the pickup 1, and starts reproduction or recording from/on the optical disk 18.

In Example 2, when the aberration correction data Dh is calculated by the inner aberration correction data operation unit 7 built in the pickup 1, without transferring the optical system aberration data Dk stored in the optical system aberration datastorage 6 to the drive unit 20 side. Therefore, data transfer within the optical disk drive is decreased, and loads on the control use circuit 21 in the drive unit 20 are reduced. The optical system aberration data Dk peculiar to the pickup 1, which is previously stored in the optical system aberration data storage 6 may include coma aberration and spherical aberration in addition to the astigmatism based on the optical system peculiar to the pickup. Since this has already been described above, tedious explanation will not be given here.

Next, after the initial aberration correction of the pickup 1 is performed by the operation flow as described with reference to FIG. 9, the optical disk drive performs reproducing or recording from/on the optical disk. With reference to FIG. 10, operations of dynamic aberration correction will be explained, which are performed during the above reproducing or recording operation.

In FIG. 10, the control circuit 22 in the drive unit 20 controls the pickup 1 and executes reproducing or recording operation from/on the optical disk 18. The pickup 1 outputs a detection signal Pd (Flow ST40).

Next, the control circuit 22 in the drive unit 20 obtains from the reproduction signal RF and error signal FE which are outputs from the signal generation circuit 25, spherical aberration data caused by a difference in substrate thickness of the optical disk 18, coma aberration data caused by the tilted angle of the optical disk 18, or both data items, and stores the data (Flow ST41).

Next, the control circuit 22 in the drive unit 20 calculates detected correction data Ddh including spherical correction data, coma correction data, or both data items, based on the spherical aberration data or the coma aberration data having been obtained, and transfers the detected correction data Ddh to the inner aberration correction data operation unit 7 built in the pickup 1 (Flow ST42).

Next, the control circuit 22 in the drive unit 20 controls the pickup 1 to read out the optical system aberration data Dk (astigmatic data) peculiar to the pickup 1, which is stored in the optical system aberration data storage 6, and transfers the data to the inner aberration correction data operation unit 7 (Flow ST43).

Next, the inner aberration correction data operation unit 7 built in the pickup 1 synthesizes the detected correction data Ddh including the obtained spherical correction data, coma correction data, or both of the data items, with the optical system aberration data Dk (astigmatic data), and then executes arithmetic processing to calculate aberration correction data Dh (Flow ST44).

Next, the control circuit 3 in the pickup 1 transfers thus calculated aberration correction data Dh to the liquid crystal drive circuit 5. The liquid crystal drive circuit 5 outputs an aberration correction signal Ph as a drive signal to the liquid crystal element 13 in the optical system component 10, based on the aberration correction data Dh. The liquid crystal element 13 is driven based on the aberration correction signal Ph. Then, the liquid crystal element 13 gives a phase difference to the light beam 17 and executes the aberration correction (Flow ST45).

Next, the control circuit 22 in the drive unit 20 repeats the flow ST40 to flow ST45 at a constant frequency, during when reproducing or recording from/on the optical disk is operated, and the aberration correction of the pickup 1 is dynamically performed.

As described above, with the optical disk drive in Example 2 according to the present invention, the inner aberration correction data operation unit 7 on the pickup 1 side calculates the aberration correction data Dh which has been obtained by synthesizing the optical system aberration data Dk peculiar to the pickup, with the detected correction data Ddh of the aberration caused by the optical disk. Therefore, the pickup itself is capable of executing the correction of the optical system aberration peculiar to the pickup and the correction of the aberration caused by the optical disk, thereby achieving reduction of loads on the control use circuit 21 in the drive unit 20, and providing a high-performance pickup which is independently capable of completing the aberration correction.

Further in Example 2, the control circuit 22 on the drive unit 20 side calculates the spherical correction data and coma correction data based on the spherical aberration data and coma aberration data having been obtained. However, the present invention is not limited to this method, and the inner aberration correction data operation unit 7 provided on the pickup 1 side may also calculate the spherical correction data and coma correction data. Accordingly, the pickup 1 is independently capable of performing a completely integrated processing for the correction of the optical system aberration caused by the optical system, and the spherical aberration and/or coma aberration caused by the optical disk. Therefore, it is possible to provide an extremely high-performance pickup which does not place any loads onto the drive unit 20 side.

EXAMPLE 3

With reference to FIG. 11, a configuration of Example 3 of the optical disk drive according to the present invention will be explained.

Example 3 features having a history data storage 8 which allows the drive use circuit 2 in the pickup 1 to store history data regarding the pickup. In Example 3, the same constituents as shown in the diagram (FIG. 3) of Example 1 are labeled the same, and a part of tedious explanations shall not be made.

In FIG. 11, reference numeral 1 indicates a pickup which is mounted inside the optical disk drive according to the present invention. The pickup 1 comprises a drive use circuit 2 and an optical system component 10. As in the case of Example 1, the drive use circuit 2 includes control circuit 3, light source drive circuit 4, liquid crystal drive circuit 5, optical system aberration data storage 6, and the like. Reference numeral 8 indicates a history data storage in which history data and the like regarding the pickup 1 is stored. The control circuit 3 controls the history data storage 8.

As in the case of the optical system aberration data storage 6, it is preferable that the history data storage 8 comprises a nonvolatile memory such as a flash memory, and it may be built in a relatively small-scale one-chip microcomputer comprising the drive use circuit 2. Alternatively, it may be mounted as an independent memory IC being integrated with the optical system aberration data storage 6. Since the internal structure of the optical system component 10 in the pickup 1 is the same as Example 1, it will not be tediously explained. Furthermore, since the drive unit 20 provided on the main unit side of the optical disk drive has the same internal structure as the drive unit 20 of the aforementioned Example 1, it will not be tediously explained here. In Example 3, it is also possible to install the aberration correction data operation unit 26 in the drive use circuit 2 in the pickup 1, as in the case of Example 2.

Next, with reference to FIG. 12, an operation will be explained in which the optical disk drive in Example 3 according to the present invention writes an error code as history data into the history data storage 8.

When the process is started, firstly, the control use circuit 21 in the drive unit 20 controls the pickup 1 to execute reproducing operation from the optical disk 18. In the reproducing operation, the pickup 1 outputs a detection signal Pd (Flow ST50).

Next, the control use circuit 21 in the drive unit 20 monitors a reproduction signal RF and an error signal FE which are outputted from the signal generation circuit 25, and determines whether or not there is an error in reading data from the optical disk 18 (Flow ST51). Here, if it is determined negatively (i.e., there is no error), the next step is a normal processing, whereas if it is determined positively (i.e., there is an error), the next step proceeds to flow ST52.

Next, if it is determined positively in flow ST51, the control use circuit 21 in the drive unit 20 determines a description of the error having occurred and outputs a predetermined error code in response to the description of the error. This error code is stored in such a manner as being associated with a predetermined error description in a form of table, for example (Flow ST52).

Next, the control use circuit 21 in the drive unit 20 transfers the outputted error code as history data to the control circuit 3 on the pickup 1 side, and directs the control circuit 3 to write the error code into the history data storage 8 (Flow ST53).

Next, the control circuit 3 in the pickup 1 writes and saves the error code having been transferred, into the history data storage 8 as stored history data Dmr (Flow ST54). After the flow ST54 is completed, the drive unit 20 executes an error processing appropriate for the status of error.

Errors detected in the flow ST51 may include, for example, a tracking error which causes a deviation of tracking, and focusing error which causes a state of unfocused.

One example of the operation flow as shown in Example 3 is to store an error code in the history data storage 8 when an error occurs in the pickup 1 mounted on the optical disk drive.

FIG. 13 shows a flowchart which explains a procedure to record the error code as stored history data.

The control circuit 22 in the drive unit 20 controls the pickup 1 to execute a reproducing or recording operation from/on the optical disk 18, and detects a detection signal Pd from the pickup 1. The detection signal Pd from the pickup 1 is inputted in the signal generation circuit 25, and the signal generation circuit 25 outputs a reproduction signal RF and an error signal FE including the focusing error to the control circuit 22 (Flow ST60).

The control circuit 22 performs an error detection based on the reproduction signal RF and the error signal FE. The error detection may include, for example, detection of focusing error, detection of tracking error, detection of malfunction of the laser light source 11, and detection of malfunction of the liquid crystal element 13. The malfunction of the liquid crystal element 13 is detected when an RF signal appropriate for the control of the liquid crystal element 13 cannot be obtained (Flow ST61).

When the control circuit 22 detects an error, the control circuit 22 analyzes the error description, such as focusing error, tracking error, malfunction of the laser light source, and malfunction of the liquid crystal element (Flow ST62).

The control circuit 22 reads out from the error code table, an error code associated with the error description thus analyzed, transfers the error code to the control circuit 3 on the pickup 1 side, and directs the control circuit 3 to write the data into the history data storage 8. The control circuit 3 in the pickup 1 writes and saves the error code having been transferred into the history data storage 8, as stored history data Dmr (Flow ST63).

Furthermore, the control circuit 3 transmits the stored history data Dmr written in the history data storage 8 to the control circuit 22 on the drive unit 20 side, and executes an error processing appropriate for the status of the error (Flow ST64).

The history information as to the operation which is recorded inside the pickup is not limited to the above example. The history information may include production history information such as serial number, date of manufacture, and location of manufacture, or other various information items, and it is possible to record these history information items into the history data storage 8.

The production history information can be obtained, for example, in the step of calculating/writing the optical system aberration data indicated by the flowchart as shown in FIG. 4.

For example, the history information items, such as serial number, date of manufacture, and location of manufacture of the optical pickup, are stored in the history information storage 8, in the step prior to the liquid crystal drive pattern initialization step in flow ST1, or in the step after the optical system aberration data writing step in flow ST8. Those history information items can be utilized for analyzing a factor of error occurrence.

In addition, in the step after the drive pattern-changing step in flow ST6, a type of drive pattern or correction details, and a degree of correction using the drive pattern are stored. Since the type of the drive pattern is determined to be appropriate for the correction details, it is possible to know the correction details from the type of the drive pattern. By storing those history information items, even if the process is suspended on the half way, it can be continued from the step where it is suspended.

In the flowchart in FIG. 4, if the loop processing from the flow ST2 to flow ST6 does not end after a predetermined period of time, the process may be ended at flow ST5, and it is possible to write information indicating the liquid crystal element is malfunctioning, in the step after the optical system aberration data writing step in flow ST8. This history information can be utilized in analyzing failure of the liquid crystal element.

Further in the flowchart of FIG. 4, it is possible to replace the optical system aberration data with the liquid crystal element aberration data. With this procedure above, the liquid crystal element is incorporated in the optical system component in a status that an initial aberration such as curve of glass substrate, which is held by the liquid crystal element itself, is stored in the optical system aberration data storage, and then, under this condition, an optical pickup can be assembled.

Since the liquid crystal element aberration data held by the liquid crystal element is stored and in addition to this data, the optical system aberration data is obtained, which is caused by an issue of precision in the optical system component and precision in assembling the components. Therefore, manufacturing loads placed on the optical pickup manufacturer can be further reduced, because the liquid crystal element aberration data is already known.

Furthermore, the control use circuit 21 in the drive unit 20 controls the pickup 1 to arbitrarily read out the history data and the like which are stored in the history data storage 8. Since the optical disk drive is allowed to arbitrarily obtain the history data and the like as to the pickup 1 being mounted, maintenance management or the like can be performed easily.

In the case where an optical disk drive is recalled as a defective product from a market due to a failure of the pickup therein, and the defective pickup is returned to the pickup manufacturer, the pickup manufacturer is immediately provided with the production history and the defective details, by reading out the history data and the like from the history data storage 8 built in the pickup 1. Therefore, a large effect can be exerted in production management and speedup in repairing.

Each block diagram shown in the Examples of the present invention is not limited to the configuration as depicted, and it should be understood that any other configuration may be applicable as far as it satisfies the scope of the invention. Each flowchart as shown in the Examples of the present invention is not limited to the operation flow as depicted, and it should be understood that operation flow may be changed arbitrarily as far as it satisfies required functions.

What is claimed is:

1. An optical disk drive formed by a connection between a pickup and a drive unit, each of which is produced individually, by a connector, wherein the pickup includes an aberration correction liquid crystal element, a drive use circuit driving the aberration correction liquid crystal element, and a photo acceptance unit receiving a light beam from an optical disk and outputting a detection signal to said drive unit through the connector, wherein the drive unit includes a control use circuit, a disk motor of the optical disk, and an aberration correction data operation unit which calculates aberration correction data by a control of the control use circuit, said drive use circuit of the pickup includes an astigmatic data storage which stores an astigmatic data of a static astigmatism peculiarly provided in an optical system in said pickup and measured in manufacturing of said pickup, wherein, after connecting said pickup and said drive unit with the connector, the drive use circuit of the pickup forwards the astigmatic data of a static astigmatism stored in the astigmatic data storage to the drive unit through the connector, said control use circuit of the drive unit calculates, based on said detection signal input through the connector, a detected correction data for correcting a dynamic aberration detected by said pickup, said aberration correction data operation unit of the drive unit receives said detected correction data and the astigmatic data forwarded through the connector and calculates an aberration correction data based on said detected correction data for correcting the dynamic aberration and said astigmatic data for correcting said static astigmatism read out from said drive use circuit, and transmits thus calculated aberration correction data to said drive use circuit through the connector, wherein the aberration correction data corrects the dynamic aberration and the static astigmatism, and the drive use circuit of said pickup drives said aberration correction liquid crystal element based on said aberration correction data returned from the control use circuit of the drive unit through the connector, and corrects the static aberration and the dynamic aberration simultaneously.

2. The optical disk drive according to claim 1, wherein,
  said static aberration is astigmatism, and
  said dynamic aberration is spherical aberration and/or coma aberration, and said detected correction data is spherical correction data for correcting the spherical aberration and/or coma correction data for correcting the coma aberration.

3. The optical disk drive according to claim 2, wherein, said drive use circuit drives an electrode provided in said aberration correction liquid crystal element based on a drive pattern according to said aberration correction data, and corrects the static aberration and the dynamic aberration simultaneously by driving the electrode.

4. The optical disk drive according to claim 1, wherein said drive use circuit further includes a history data storage, and said control use circuit allows history data to be read/written from/to the history data storage.

5. The optical disk drive according to claim 1, wherein the pickup and the drive unit are physically independent components from each other.

* * * * *

UNITED STATES PATENT AND TRADEMARK OFFICE
CERTIFICATE OF CORRECTION

PATENT NO. : 8,111,594 B2
APPLICATION NO. : 11/284423
DATED : February 7, 2012
INVENTOR(S) : Masayuki Iwasaki et al.

It is certified that error appears in the above-identified patent and that said Letters Patent is hereby corrected as shown below:

On the Title page, Item (75):
Change

"(75) Inventors: Masayuki Iwasaki, Saitama (JP); Naoki Fujii, Saitama (JP); Selichi Ohsawa, Saitama (JP)"

To be

--(75) Inventors: Masayuki Iwasaki, Saitama (JP); Naoki Fujii, Tokyo (JP); Selichi Ohsawa, Tochigi (JP)--

Signed and Sealed this
Eighteenth Day of September, 2012

David J. Kappos
*Director of the United States Patent and Trademark Office*